US006377237B1

(12) United States Patent
Sojourner

(10) Patent No.: US 6,377,237 B1
(45) Date of Patent: Apr. 23, 2002

(54) METHOD AND SYSTEM FOR ILLUMINATING A LAYER OF ELECTRO-OPTICAL MATERIAL WITH PULSES OF LIGHT

(75) Inventor: Douglas C. Sojourner, Fremont, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/479,722

(22) Filed: Jan. 7, 2000

(51) Int. Cl.[7] .............................................. G06F 13/00

(52) U.S. Cl. .......................................... 345/102; 345/97

(58) Field of Search ............................ 345/102, 98, 99, 345/100, 87, 88, 89, 90, 91, 92, 93, 94, 95, 96, 97; 349/61, 72, 54

(56) References Cited

U.S. PATENT DOCUMENTS 5,617,112 A * 4/1997 Yoshida et al. ............. 345/102
5,914,764 A * 6/1999 Henderson .................. 345/201
6,188,379 B1 * 2/2001 Kaneko ...................... 345/102
6,211,852 B1 * 4/2001 Oono et al. ................. 345/102
6,239,778 B1 * 5/2001 Palffy-Muhoray et al. .... 345/87

* cited by examiner

*Primary Examiner*—Xiao Wu

(57) ABSTRACT

A monitor pixel that includes a portion of the layer of electro-optical material is provided. A measured response time of the electro-optical material is measured using the monitor pixel. Illumination of the layer of the electro-optical material is then delayed by a time corresponding to the measured response time of the electro-optical material. The system for illuminating a layer of electro-optical material with pulses of light comprises a monitor pixel, a monitor pixel driver, an optical response detector and an illumination control circuit. The monitor pixel includes a portion of the layer of electro-optical material. The monitor pixel driver is configured to drive the monitor pixel with a monitor pixel drive signal. The optical response detector is coupled to the monitor pixel and is configured to generate a detection signal indicating a change in an optical property of the monitor pixel. The response time measurement circuit is configured to measure a measured response time of the electro-optical material in response to the monitor pixel drive signal and the detection signal. The illumination control circuit is configured to delay illumination of the layer of the electro-optical material by a time corresponding to the measured response time of the electro-optical material.

18 Claims, 9 Drawing Sheets

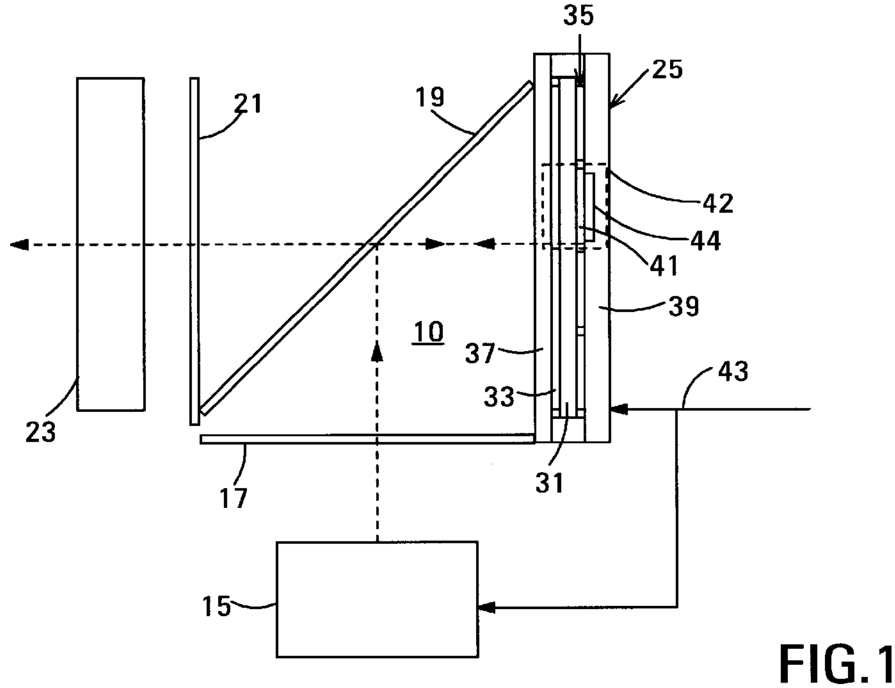
FIG. 1
(PRIOR ART)
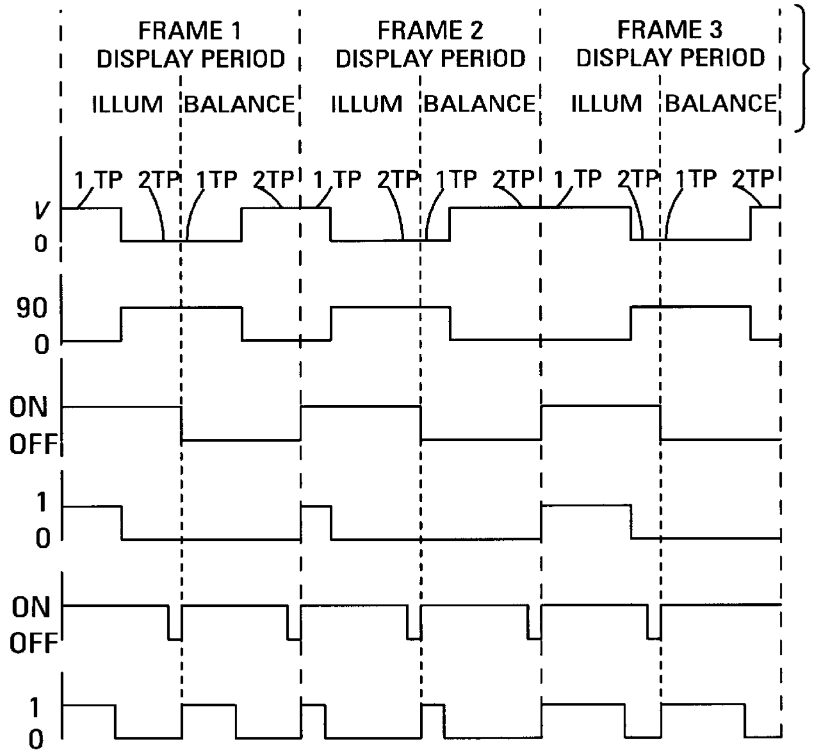
FIG. 2A
FIG. 2B
FIG. 2C
FIG. 2D
FIG. 2E
FIG. 2F
FIG. 2G
(PRIOR ART)

METHOD AND SYSTEM FOR ILLUMINATING A LAYER OF ELECTRO-OPTICAL MATERIAL WITH PULSES OF LIGHT

TECHNICAL FIELD

The invention relates generally to display devices, and, more particularly, to a method and system in which the electro-optical material of the spatial light modulator used in a display device is illuminated with pulses of light delayed by a time equal to the measured response time of the electro-optical material to linearize the grey scale of the display device.

BACKGROUND OF THE INVENTION

Recently, display devices based on electro-optical materials such as ferroelectric liquid crystal materials have been introduced. Such display devices can form part of a miniature, wearable display, sometimes called an eyeglass display, and also can form part of a front- or rear-projection display. FIG. 1 shows an example of a display device 1. The display device is composed of reflective light valve 10, light source 15, which generates light that illuminates the light valve, and output optics 23 that focus the light to form an image (not shown). The light valve is composed of reflective spatial light modulator 25, polarizer 17, beam splitter 19 and analyzer 21. The display device shown may form part of a miniature, wearable display, a projection display or other types of displays.

In display device 1, light generated by light source 15 passes through polarizer 17. The polarizer polarizes the light output from the light source. Beam splitter 19 reflects a fraction of the polarized light output from the polarizer towards spatial light modulator 25. The spatial light modulator is divided into a two-dimensional array of picture elements (pixels) that define the pixels of the display device. In this disclosure, the term display pixel X will be used as a abbreviation for the term pixel of the display device defined by pixel X of spatial light modulator. The beam splitter transmits a fraction of the light reflected by the spatial light modulator to analyzer 21.

The direction of an electric field in each pixel of spatial light modulator 25 determines whether or not the direction of polarization of the light reflected by the pixel is rotated by 90° relative to the direction of polarization of the incident light. The light reflected by each pixel of the spatial light modulator passes through beam splitter 19 and analyzer 21 and is output from the light valve depending on whether or not its direction of polarization was rotated by the spatial light modulator. The light output from light valve 10 passes to output optics 23.

Light source 15 may be composed of LEDs. The LEDs are of three different colors in a color display. Other light-emitting devices whose output can be rapidly modulated may alternatively be used as light source 15. As a further alternative, a white light source and a light modulator (not shown) may be used. The light modulator modulates the amplitude of the light generated by the light source to define the illumination period and balance period of the spatial light modulator. In a light valve for use in a color display device, the light modulator additionally modulates the color of the light output from the light source.

Polarizer 17 polarizes the light generated by light source 15. The polarization is preferably linear polarization. Beam splitter 19 reflects the polarized light output from the polarizer towards spatial light modulator 25, and transmits the polarized light reflected by the spatial light modulator to analyzer 21. The direction of maximum transmission of the analyzer is orthogonal to that of the polarizer in this example.

Spatial light modulator 25 is composed of transparent electrode 33 deposited on the surface of transparent cover 37, reflective electrode 35 located on the surface of semiconductor substrate 39, and layer 31 of electro-optical material sandwiched between the transparent electrode and the reflective electrode. The reflective electrode is divided into a two-dimensional array of pixel electrodes that define the pixels of the spatial light modulator and of the light valve. A substantially-reduced number of pixel electrodes is shown to simplify the drawing. For example, in a light valve for use in a large-screen computer monitor, the reflective electrode could be divided into a two-dimensional array of 1600×1200 pixel electrodes. An exemplary pixel electrode is shown at 41. Each pixel electrode reflects the portion of the incident polarized light that falls on it towards beam splitter 19.

A pixel drive circuit applies a pixel drive signal to the pixel electrode of each pixel of spatial light modulator 25. Pixel drive circuit 44 of exemplary pixel 42 is shown in this example as being located in semiconductor substrate 39. The pixel drive signal alternates between two different voltage levels, a high state and a low state. When a liquid crystal material is used as the electro-optical material of layer 31, transparent electrode 33 is maintained at a fixed potential mid-way between the voltage levels of the pixel drive signal. The potential difference between the pixel electrode and the transparent electrode establishes an electric field across the part of liquid crystal layer 31 between the pixel and transparent electrodes. The direction of the electric field determines whether the liquid crystal layer rotates the direction of polarization of the light reflected by the pixel electrode, or leaves the direction of polarization unchanged.

When display device 1 forms part of a miniature, wearable display, output optics 23 are composed of an eyepiece that receives the light reflected by reflective electrode 35 and forms a virtual image at a predetermined distance in front of the viewer (not shown). In a cathode-ray tube replacement or in a projection display, the output optics are composed of projection optics that focus an image of the reflective electrode on a transmissive or reflective screen (not shown). Optical arrangements suitable for use as an eyepiece or projection optics are well known in the art and will not be described here.

Since the direction of maximum transmission of analyzer 21 is orthogonal to the direction of polarization defined by polarizer 17, light whose direction of polarization has been rotated through 90° by a pixel of spatial light modulator 25 will pass through the analyzer and be output from light valve 10 whereas light whose direction of polarization has not been rotated will not pass through the analyzer. The analyzer only transmits to output optics 23 light whose direction of polarization has been rotated by pixels of the spatial light modulator. The direction of the electric field applied to each pixel of the spatial light modulator determines whether the corresponding display pixel will appear bright or dark. When a display pixel appears bright, it will be said to be ON, and when the display pixel appears dark, it will be said to be OFF.

The direction of maximum transmission of analyzer 21 can alternatively be arranged parallel to that of polarizer 17, and a non-polarizing beam splitter can be used as beam splitter 19. In this case, spatial light modulator 25 operates in the opposite sense to that just described.

To produce the grey scale required by to display an image notwithstanding the binary optical characteristics of the display pixels, the apparent brightness of each display pixel is varied by temporally modulating the direction of polarization of the light reflected by the corresponding pixel of spatial light modulator 25. This, in turn, temporally modulates the light output by the corresponding display pixel. The light is modulated by defining a basic time period that will be called the illumination period of the spatial light modulator. The pixel electrode is driven by the pixel drive signal that switches the pixel from ON to OFF. The fraction of the illumination period in which the pixel is in its ON state determines the apparent brightness of the display pixel.

Ferroelectric liquid crystal-based spatial light modulators suffer the disadvantage that, after each time the pixel drive signal has been applied to the pixel electrode to cause the pixel to change the direction of polarization of the light reflected by it, the DC balance of the pixel must be restored. This is done by defining a second basic time period called the balance period, equal in duration to the illumination period, and driving the pixel electrode with a complementary pixel drive signal having high state and low state durations that are complementary to the high state and low state durations of the pixel drive signal during the illumination period. The illumination period and the balance period collectively constitute a display period.

To prevent the complementary pixel drive signal from causing the display device to display a substantially uniform, grey image, light source 15 illuminating light valve 10 is modulated so that the light valve is illuminated with a pulse of light having a duration equal to that of the illumination period, and is not illuminated during the balance period. Modulating the light source as just described to illuminate the light valve with pulses of light reduces the light throughput of the light valve to about half of that which could be achieved if DC balance restoration were unnecessary.

The pixel drive circuit of each pixel of spatial light modulator 25 determines the duration of the ON state of the corresponding display pixel in response to a portion of input video signal 43 corresponding to the location of the pixel in the spatial light modulator.

FIGS. 2A–2E illustrate the operation of exemplary pixel 42 of spatial light modulator 25 shown in FIG. 1 during three consecutive display periods. Pixel 42 is controlled by pixel electrode 41. The remaining pixels operate similarly. FIG. 2A shows each display period composed of an illumination period (ILLUM) and a balance period (BALANCE) having equal durations. Each display period may correspond to one frame of input video signal 43, for example, as shown. As another example, each display period may correspond to a fraction of one frame of the input video signal.

FIG. 2B shows the pixel drive signal applied to exemplary pixel electrode 41. Transparent electrode 33 is held at a voltage level of V/2, so that changing the voltage level on the pixel electrode from 0 to V reverses the direction of the electric field applied to layer 31 of ferroelectric liquid crystal material. The level of the pixel drive signal is V for a first temporal portion 1 TP of each illumination period. The level of the pixel drive signal is 0 for the second temporal portion 2 TP constituting the remainder of the illumination period, and also for the first temporal portion 1TP of the subsequent balance period. The first temporal portion of the balance period has a duration equal to the first temporal portion of the illumination period. However, the level of the pixel drive signal is 0 during the first temporal portion of the balance period, whereas the level of the drive signal is V during the first temporal portion of the illumination period. Finally, the level of the pixel drive signal changes to V for the second temporal portion 2 TP constituting the remainder of the balance period. Consequently, during the balance period, the level of the pixel drive signal is 0 and V for times equal to the times that it was at V and 0, respectively, during the illumination period. As a result, when the transparent electrode 33 is held at a constant voltage equal to V/2, the electric field applied to the liquid crystal material of the pixel averages to zero over the display period.

In the example shown, the duration of the first temporal portion 1 TP of the drive signal is different in each of the three illumination periods. The duration of the first temporal portion, and, hence, of the second temporal portion, of each illumination period depends on the voltage level of the corresponding sample of input video signal 43.

FIG. 2C shows the effect of spatial light modulator 25 on the direction of polarization of the light impinging on analyzer 21. The direction of polarization is indicated by the absolute value of the angle $\alpha$ between direction of polarization of the light impinging on the analyzer and the direction of maximum transmissivity of the analyzer. The analyzer transmits light having an angle $\alpha$ close to zero and absorbs light having an angle $\alpha$ close to 90°. In each display period, the angle $\alpha$ has values corresponding to the display pixel being bright and dark for equal times due to the need to restore the DC balance of the pixel.

FIG. 2D shows the modulation of light source 15. The light source is ON throughout the illumination period of each display period, and is OFF during the following balance period.

FIG. 2E shows the light output from display pixel 42, i.e., the pixel of the display device corresponding to exemplary pixel 42 of spatial light modulator 25. Light is output from the display pixel only during the first temporal portion of the illumination period of each display period. No light is output during the second temporal portion of the illumination period. Moreover, no light is output during the balance period of the display period because the light source 15 is OFF during the balance period.

In the spatial light modulator just described, a bistable electro-optical material can be used instead of the conventional ferroelectric liquid crystal material as layer 31 of electro-optical material. Whether or not the bistable electro-optical material rotates the direction of polarization of the light reflected by the pixel electrode is set by applying a short-duration electrical pulse of the required polarity to the pixel electrode. The bistable electro-optical material will retain the optical property set by the electrical pulse until the material is reset by applying a short duration optical pulse of the opposite polarity. Bistable electro-optical materials have the advantage that they can be driven by a pixel drive signal that is inherently DC balanced, so the balance period described above need not be provided. Consequently, using a bistable electro-optical material provides a larger luminous efficiency than using an electro-optical material that requires a non-illuminated balance period because the spatial light modulator can be illuminated for most of the display period.

Moreover, much of the disadvantage in luminous efficiency of electro-optical materials that require a DC balance period can be overcome by adding a switchable polarization inverter to the optical path between spatial light modulator 25 and beam splitter 19. This allows the spatial light modulator to be illuminated with a pulse of light in each illumination period and a pulse of light in each balance period. Blanking periods between the light pulses provide time for the polarization inverter to switch. A display device using this technique is described in U.S. patent application Ser. No. 09/183,554, assigned to the assignee of this disclosure and incorporated in this disclosure by reference. The polarization inverter is switched to one of its states during the illumination period and to the other of its states during the balance period. The polarization inverter inverts the negative image that would otherwise be generated during the balance period.

FIGS. 2F and 2G illustrate the operation of a display device that incorporates a polarization inverter. The pixel drive signal is as shown in FIG. 2B. FIG. 2F shows the light output by light source 15. The light source illuminates spatial light modulator 10 with a pulse of light during each of the illumination period and the balance period. The display device that includes the polarization inverter therefore outputs light during both the illumination period and the balance period, as shown in FIG. 2G.

In the example of the micro-display described above with reference to FIGS. 2A–2E, the pixel drive signal switches the pixel ON prior to the beginning of the illumination period, as shown in FIG. 2B in which the display pixel is in its ON state when the pixel electrode is at voltage V, and light source 15 illuminates spatial light modulator 25 during each illumination period. Then, at a later time during the illumination period, the pixel drive signal reverts to its original state to switch the display pixel OFF. The fraction of the illumination period during which the display pixel was ON sets the apparent brightness of the pixel. Despite being switched ON before the beginning of the illumination period, the display pixel is not illuminated prior to the beginning of the illumination period and, hence, does not appear bright until the beginning of the illumination period.

FIGS. 2A and 2B respectively show the change in state of the pixel drive signal and the resulting change in the direction of polarization of the light reflected by the pixel of spatial light modulator 25 occurring synchronously. In a practical example, the optical properties of electro-optical materials in general and of liquid crystal materials in particular do not switch instantaneously as shown in FIG. 2B in response to a change in state of the pixel drive signal. Instead, there is a delay between the time when the pixel drive signal changes state and when the optical property of the electro-optical material changes state in response to the pixel drive signal. This delay will be called the response time of the electro-optical material. Since the delay may differ depending on the direction in which the optical property of the electro-optical material changes, the electro-optical material is characterized by two response times, one for each direction. In this disclosure, the response time relating to the change in the optical property that causes the display pixel to change from bright to dark will be called the bright-to-dark response time, and that relating to the change in the optical property that causes the display pixel to change from dark to bright will be called the dark-to-bright response time.

FIG. 3A shows change 51 in the state of the pixel drive signal and FIG. 3B shows the delay in resulting change 52 in the optical property of the electro-optical material, namely, the direction of polarization of the light reflected by the pixel of the spatial light modulator. This delay is determined by the bright-to-dark response time of the electro-optical material. FIG. 3B also shows the delay in change 56 in the optical property of the electro-optical material resulting from change 54 in the state of the pixel drive signal shown in FIG. 3A. This delay is determined by the bright-to-dark-to-bright response time of the electro-optical material.

The display device 1 operates on the basic assumption that the duty cycle of the pixel drive signal is proportional to the pixel value fed to the pixel and that the apparent brightness of the corresponding display pixel is proportional to the duty cycle of the pixel drive signal. Thus, the apparent brightness of the display pixel is proportional to the pixel value. However, the delay in the optical properties of spatial light modulator 25 changing state caused by the response times of the electro-optical material results in a non-linear relationship between the duty cycle of the pixel drive signal and the apparent brightness of the corresponding display pixel. In the example just described in which the display pixel is turned OFF during the illumination period, the delay $D_b$ in the optical property of the spatial light modulator changing state makes the display pixel appear brighter than the brightness defined by the pixel value that defines the duty cycle of the pixel drive signal. This effect is especially severe at apparent brightnesses near black level. The effect of the response times of the electro-optical material on the linearity of the grey scale displayed by the display pixels can be corrected by delaying the illumination of the spatial light modulator by a time equal to the respective response time of the electro-optical material.

One way of compensating for the response time of the electro-optical material of the spatial light modulator is to program the response time into a configuration register that is part of the firmware that controls light source 15 of the display device. However, the response time of the electro-optical material can vary from batch-to-batch and can vary dynamically with such factors as temperature and the age of the electro-optical material. It is difficult to compensate for the above-mentioned dynamic variations in the response time of the electro-optical material using firmware programming. Furthermore, the need for additional firmware to program the response time increases the complexity of the display device.

What is needed, therefore, is a dynamic, accurate, on-chip method and system for dynamically determining response time of the electro-optical material to allow the illumination of the spatial light modulator to be delayed by the appropriate amount.

SUMMARY OF THE INVENTION

The invention provides a method of illuminating a layer of electro-optical material with pulses of light. In the method, a monitor pixel that includes a portion of the layer of electro-optical material is provided. A measured response time of the electro-optical material is measured using the monitor pixel. Illumination of the layer of the electro-optical material is then delayed by a time corresponding to the measured response time of the electro-optical material.

The invention also provides a system for illuminating a layer of electro-optical material with pulses of light. The system comprises a monitor pixel, a monitor pixel driver, an optical response detector and an illumination control circuit. The monitor pixel includes a portion of the layer of electro-optical material. The monitor pixel driver is configured to drive the monitor pixel with a monitor pixel drive signal. The optical response detector is coupled to the monitor pixel and is configured to generate a detection signal indicating a change in an optical property of the monitor pixel. The response time measurement circuit is configured to measure a measured response time of the electro-optical material in response to the monitor pixel drive signal and the detection signal. The illumination control circuit is configured to delay illumination of the layer of the electro-optical material by a time corresponding to the measured response time of the electro-optical material.

In both the method and system according to the invention, current flowing into or out of the monitor pixel may be used to measure the measured response time of the electro-optical material.

An advantage of the invention is that it enables the pulses of light illuminating the electro-optical material to be delayed in accordance with the actual, measured response time of the electro-optical material. Thus, a display device incorporating the electro-optical material can display an accurate and linear grey scale notwithstanding batch-to-batch variations in the response time of the electro-optical material, and changes in the response time caused by such factors as temperature and aging.

Another advantage of the invention is that it improves the efficiency of a display element employing the invention since it allows the electro-optical material to be illuminated for a greater fraction of each illumination period and, optionally, balance period.

Another advantage of the invention is that it can be embodied in circuits fabricated in the same semiconductor substrate as the pixel drive circuits and auxiliary circuits of the spatial light modulator of which the layer of electro-optical material is part.

Another advantage of the invention is that it improves the image quality provided by a display element in which it is incorporated.

Another advantage of the invention is that it is simple in design and easily implemented on a mass scale for commercial production.

Other features and advantages of the invention will become apparent upon examination of the following drawings and detailed description.

BRIEF DESCRIPTION OF THE DRAWINGS

FIG. 1 is a schematic diagram of a display device incorporating a spatial light modulator based on an electro-optical material.

FIGS. 2A–2E are timing diagrams illustrating the operation of the display device shown in FIG. 1 when illuminated only during each illumination period.

FIGS. 2F and 2G are timing diagrams illustrating the operation of the display device shown in FIG. 1 when illuminated during each illumination period and each balance period.

FIGS. 3A–3F show an example in which the spatial light modulator is illuminated only during each illumination period. FIGS. 3A and 3G–3K show an example in which the spatial light modulator is illuminated during each illumination period and each balance period.

DETAILED DESCRIPTION OF THE INVENTION

Figures 3A, 3B, 3C, 3D, 3E, 3F, 3G, 3H, 3I, 3J, 3K:
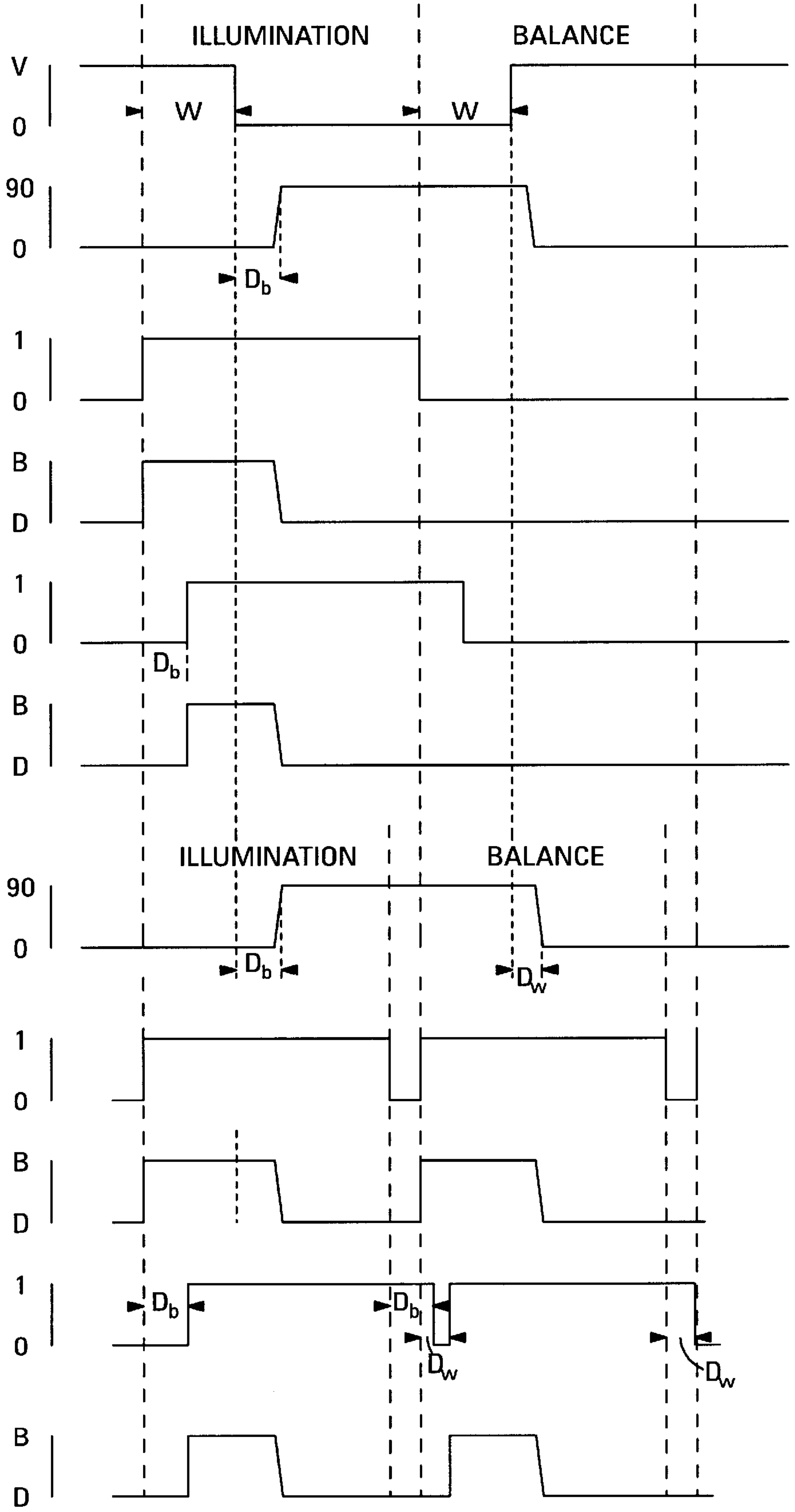
FIGS. 3A–3K are timing diagrams illustrating how the response time of the electro-optical material causes a non-linear grey scale to be displayed and how delaying the illumination of the spatial light modulator by a time equal to the measured response time in accordance with the invention corrects the non-linearity.

In the following description of the invention, reference will be made throughout to the elements of the display device shown in FIG. 1. Moreover, while the following description will include reference to discrete elements and circuit blocks, the system according to the invention may be implemented and the method according to the invention may be practiced by fabricating the various circuit elements in a single silicon die. Furthermore, while the following description will refer to reflective spatial light modulator 25 whose pixel drive circuits operate in response to digital pixel values and generate respective pixel drive signals that provide DC balancing, the invention is equally applicable to other types of light modulators, including but not limited to transmissive spatial light modulators. The invention is applicable to all light modulators in which it is desired to provide a known, linear relationship between the pixel value and the apparent brightness of the pixel. For example, the invention disclosed herein is applicable to the spatial light modulator of a sequential color display device that operates in response to analog pixel values, to the spatial light modulator of a sequential color display device that operates in response to digital pixel values, and incorporates an electro-optical material that does not require DC balancing, and to other spatial light modulators based on an electro-optical material.

As used in this disclosure, the term "on-chip" refers to the circuit embodying the invention being fabricated in the same integrated circuit chip as that in which the pixel drive circuits and auxiliary circuits of the spatial light modulator are fabricated. The pixel drive circuits, the auxiliary circuits and the circuits embodying the invention may be fabricated in the same integrated circuit chip.

The invention, to be described in detail below, measures the response time of the electro-optical material of spatial light modulator 25 and then delays the LIGHT_ON signal by a time equal to the measured response time to generate the control signal ADJ_LIGHT_ON. The light source 15 then illuminates the electro-optical material of the spatial light modulator in response to the control signal ADJ_LIGHT_ON. Thus, illumination of the spatial light modulator is delayed by a time equal to the measured response time of the electro-optical material of the spatial light modulator. This enables a display device incorporating the invention to display an image with an accurate, linear grey scale regardless of variations in the response time of the electro-optical material with the batch, temperature and age of the electro-optical material.

In an embodiment of the invention for use in a display device in which spatial light modulator 25 is illuminated only during the illumination period of each display period, only one of the bright-to-dark response time and the dark-to-bright response time of the electro-optical material of the spatial light modulator need be measured. The response time that is measured depends on whether the display pixels are ON or OFF, respectively, at the start of the illumination period. For example, when the display pixels are ON at the start of the illumination period, the bright-to-dark response time measured and the LIGHT_ON signal is delayed by a time equal to the bright-to-dark response time to generate the ADJ_LIGHT_ON signal.

In an embodiment of the invention for use in a spatial light modulator that is illuminated during both the illumination period and the balance period, the invention measures both the bright-to-dark and the dark-to-bright response times and then delays the LIGHT_ON signal by one of the response times during each illumination period and by the other of the response times during each balance period to generate the ADJ_LIGHT_ON signal. The one of the response times by which the LIGHT_ON signal is delayed during each illumination or balance period depends on whether the display pixels are ON or OFF at the start of the respective period. For example, when the display pixels are ON at the start of the illumination period and are OFF at the start of the balance period, both response times are measured and, to generate the ADJ_LIGHT_ON signal, the LIGHT_ON signal is delayed by a time equal to the bright-to-dark response time during each illumination period and is delayed by a time equal to the dark-to-bright response time during each balance period.

When the bright-to-dark and dark-to-bright response times are similar, acceptable results may be obtained by measuring only one of the response times and generating the ADJ_LIGHT_ON by delaying the LIGHT_ON signal by a time equal to the measured response time relative to the start of both the illumination period and the balance period.

The invention now be first described with reference to FIGS. 3A–3K. In the examples to be described, the optical property of the electro-optical material to which the response times pertain is the direction of polarization of the light reflected by spatial light modulator 25.

FIG. 3A shows the pixel drive signal applied to pixel electrode 41 of exemplary pixel 42 of spatial light modulator 25 during one display period. FIG. 3B shows the resulting direction of polarization of the light reflected by the pixel relative to the direction of maximum transmission of analyzer 21. In the example shown, the pixel drive signal in its 0 state sets the direction of polarization of the light reflected by the pixel to 90° relative to the direction of maximum transmission. This corresponds to the OFF state of the display pixel 42, in which the display pixel appears dark. The pixel drive signal in its V state sets the direction of polarization of the light reflected by the pixel to 0° relative to the direction of maximum transmission and corresponds to the ON state of the pixel in which the pixel appears bright.

The pixel drive signal shown in FIG. 3A has two changes of state. The change of state 51 from V to 0 occurs during the illumination period and causes a change 52 in the direction of polarization of the light reflected by pixel 42 from 0° to 90° relative to the direction of maximum transmission of the analyzer 21. The pixel drive signal has a pulse width W during the illumination period. FIG. 3B shows that the change in the optical property of the pixel, i.e., the change in the direction of polarization of the light reflected by the pixel, occurs at the bright-to-dark response time $D_b$ after the change of state 51 of the pixel drive signal.

FIG. 3D shows that the apparent brightness of display pixel 42 changes from bright to dark simultaneously with the change 52 in the direction of polarization of the light reflected by pixel 42.

FIG. 3C shows the control signal LIGHT_ON that controls the light source 15 to illuminate spatial light modulator 25. In this example, the light source illuminates the spatial light modulator when the LIGHT_ON signal is high. In the example shown in FIG. 3C, the LIGHT_ON signal causes the light source to illuminate the spatial light modulator conventionally, i.e., simultaneously with the illumination period. FIG. 3D also shows that, when spatial light modulator 25 is illuminated simultaneously with the illumination period, the bright-to-dark response time of the electro-optical material causes the pulse width of the light output by display pixel 42 to be greater than the pulse width W of the pixel drive signal in the illumination period. Consequently, the apparent brightness of display pixel 42 is greater than an apparent brightness proportional to the pulse width of the pulse width W of the pixel drive signal. Moreover, since the bright-to-dark response time is substantially independent of the pulse width W, the relationship between the apparent brightness of display pixel 42 and the pulse width of the pixel drive signal is non-linear. Consequently, the grey scale displayed by display pixel 42 is not linearly related to the pulse width W.

FIG. 3E shows the control signal ADJ_LIGHT_ON for driving the light source 15 to mitigate the effect of bright-to-dark response time of the electro-optical material of spatial light modulator 25 on the apparent brightness of display pixel 42. FIG. 3F shows how driving the light source 15 with the control signal ADJ_LIGHT_ON causes the light output by display pixel 42 to have a pulse width substantially equal to that of the pixel drive signal shown in FIG. 3A. The control signal ADJ_LIGHT_ON shown in FIG. 3E is a version of the control signal LIGHT_ON shown in FIG. 3C that has been delayed by a time equal to the measured bright-to-dark response time $D_b$ of the electro-optical material of spatial light modulator 25. It can be seen from FIG. 3F that, as a result of driving the light source 15 with the control signal ADJ_LIGHT_ON, the pulse width of the light output by display pixel 42 is substantially equal to the pulse width $W_i$, of the pixel drive signal during the illumination period.

FIG. 3A also shows the change of state 54 of the pixel drive signal from 0 to V. The pixel drive signal has a pulse width W during the balance period. The pulse width during the balance period is equal to that during the illumination period but is in the opposite sense. The change of state 54 occurs during the balance period. The change of state 54 causes the change 56 in the direction of polarization of the light reflected by pixel 42 from 90° to 0° relative to the direction of maximum transmission of the analyzer 21. It can be seen from FIG. 3B that change 56 in the direction of polarization occurs later than the change of state 54 of the pixel drive signal. However, as shown in FIG. 3C, this delay has no effect on the apparent brightness of display pixel 42 because spatial light modulator 25 is not illuminated during the balance period. Thus, when the spatial light modulator is not illuminated during the balance period, the control signal LIGHT_ON need only be delayed by the bright-to-dark response time $D_b$ of the electro-optical material to generate the control signal ADJ_LIGHT_ON capable of correcting for the effect of the response time of the electro-optical material on the apparent brightness of the display pixels.

When the electro-optical material of spatial light modulator 25 is a bistable electro-optical material, or the display device additionally includes a polarization inverter (not shown) as described above, the spatial light modulator can be illuminated during both the illumination and balance periods to increase the illumination efficiency of the display device. FIG. 3G shows that the change 56 in the direction of polarization of the light reflected by pixel 42 occurs at the dark-to-bright response time $D_w$ after the change of state 54 of the pixel drive signal.

FIG. 3H shows the control signal LIGHT_ON that controls the light source 15 to illuminate spatial light modulator 25 during both the illumination and balance periods. In the example shown in FIG. 3H, the LIGHT_ON signal causes the light source to illuminate the spatial light modulator conventionally, i.e., simultaneously with the illumination period and simultaneously with the balance period. FIG. 3I shows that, when spatial light modulator 25 is illuminated substantially simultaneously with the illumination period and the balance period, the bright-to-dark response time causes the light output by display pixel 42 during the illumination period to have a pulse width greater than the pulse width W of the pixel drive signal, and the dark-to-bright response time causes the light output during the balance period to have a pulse width greater than the pulse width W of the pixel drive signal. Consequently, the apparent brightness of display pixel 42 is greater than an apparent brightness proportional to the pulse widths W.

FIG. 3J shows the control signal ADJ_LIGHT_ON for driving the light source 15 to mitigate the effect of the bright-to-dark and dark-to-bright response times of the electro-optical material of spatial light modulator 25 on the apparent brightness of display pixel 42. FIG. 3K shows how driving the light source 15 with the control signal ADJ_LIGHT_ON causes the light output by display pixel 42 to have pulse widths substantially equal to the pulse widths W of the pixel drive signal shown in FIG. 3A. The control signal ADJ_LIGHT_ON shown in FIG. 3J is a version of the control signal LIGHT_ON shown in FIG. 3H that has been delayed by a time equal to the measured bright-to-dark response time $D_b$ of the electro-optical material of spatial light modulator 25 during the illumination period and by a time equal to the measured dark-to-bright response time $D_w$ during the balance period. It can be seen from FIG. 3K that, as a result of driving the light source 15 with the control signal ADJ_LIGHT_ON, the light output by display pixel 42 has pulse widths substantially equal to the pulse widths W of the pixel drive signal during both the illumination period and the balance period.

Figure 4:
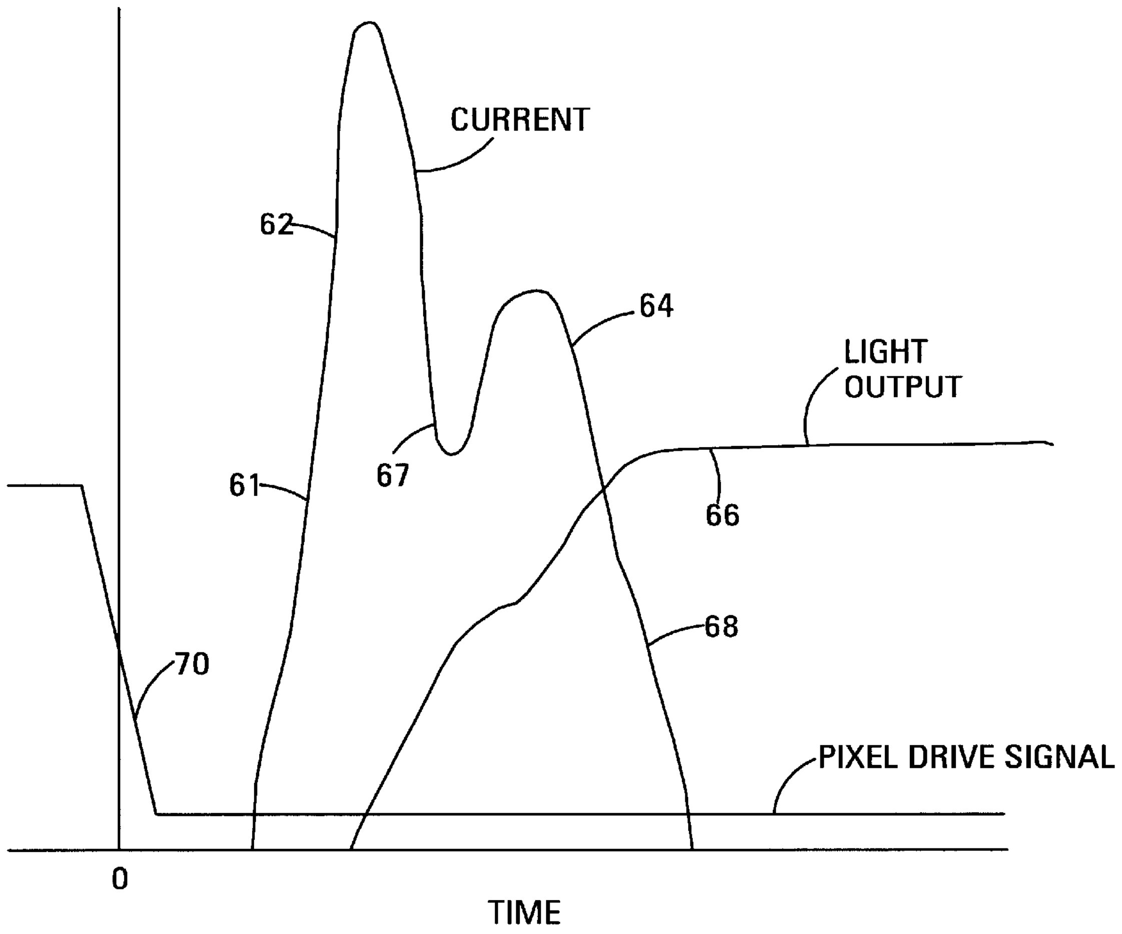
FIG. 4 is a graph showing how the magnitude of the current flowing into or out of a pixel is indicative of the optical state of the pixel.

FIG. 4, which shows the magnitude of the current flowing into or out of exemplary pixel 42 of spatial light modulator 25 and the light output by display pixel 42 in response to a change in the state of the pixel drive signal applied to pixel electrode 41, will now be described, additionally referring to FIG. 1. As noted above, display pixel 42 is the pixel of display device 1 corresponding to pixel 42 of the spatial light modulator. The pixel drive signal 70 changes state at the zero of the time axis. The current flowing into or out of the pixel is shown as trace 61.

The current flowing into or out of the pixel includes first current pulse 62 and second current pulse 64. First current pulse 62 results from the change in state of the pixel drive signal 70 changing the charge on the capacitor formed by pixel electrode 41, common electrode 33 and the portion of layer 31 of electro-optical material between the electrodes. Current pulse 62 does not change the optical state of the electro-optical material of the pixel. Second pulse 64 is of a longer duration and changes the optical state of the electro-optical material of the pixel. For example, when the electro-optical material is a ferroelectric liquid crystal material, the second current pulse changes the direction of orientation of the director of the ferroelectric liquid crystal material to change the optical state of the pixel.

Trace 66 represents the light output by display pixel 42. The falling edge of second current pulse 64 occurs substantially simultaneously with the change in the light output. Thus, the response time of the electro-optical material can be measured by measuring the time that elapses between the pixel drive signal 70 changing state and a time determined by detecting the falling edge 68 of second current pulse 64, or a time determined by detecting when the second current pulse falls below a threshold level. The response time measured in this way corresponds to the response time $D_b$ or $D_w$ illustrated in FIG. 3G, depending on whether the change in the optical state of the electro-optical material causes the state of display pixel 42 to change from ON to OFF, or vice versa.

Figure 5:
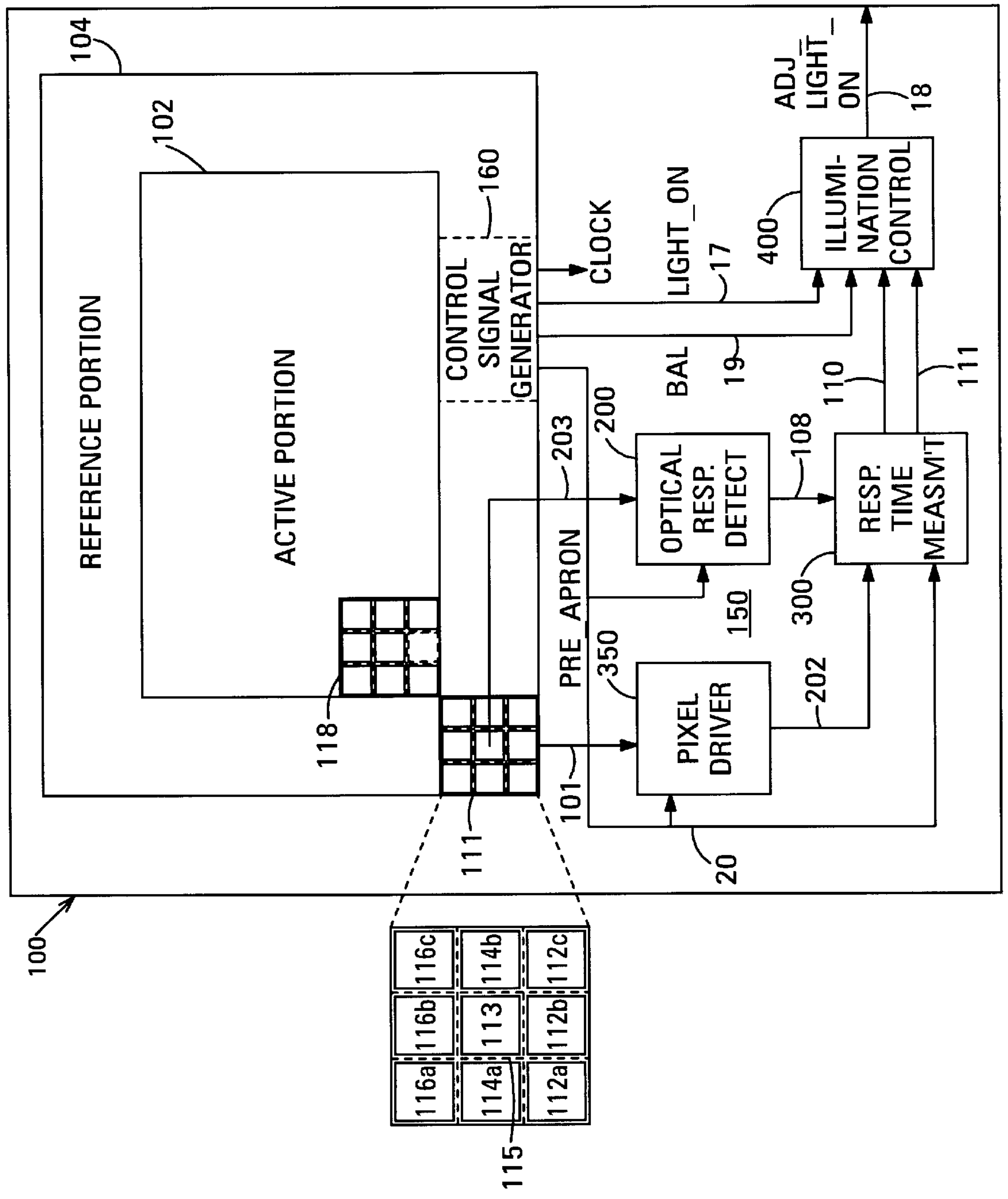
FIG. 5 is a block diagram of a spatial light modulator incorporating in its silicon substrate an example of a system according to the invention for illuminating an electro-optical material.

FIG. 5 is a block diagram showing spatial light modulator 100 incorporating the system according to the invention for illuminating the electro-optical material of the spatial light modulator. The system is composed of the monitor pixel 115 and the response time measurement and correction circuit 150 according to the invention. Spatial light modulator 100 forms part of a display device similar to display device 1 shown in FIG. 1, and can be substituted for spatial light modulator 25 shown in FIG. 1. Elements of display device 1 will be referred to throughout the following description.

Spatial light modulator 100 includes active portion 102 and reference portion 104. Active portion 102 is the portion of the spatial light modulator that generates the image for display to the viewer. Reference portion 104 is adjacent or surrounds the active portion and includes the reference pixel 115 used to determine the response time of the electro-optical material of the spatial light modulator.

The structure of spatial light modulator 100 is similar to that of spatial light modulator 25 shown in FIG. 1. In particular, spatial light modulator 100 includes a layer of an electro-optical material similar to the layer 31 and a transparent common electrode similar to the common electrode 33 overlaying both the active portion 102 and the reference portion 104. Spatial light modulator 100 includes a semiconductor substrate similar to the semiconductor substrate 39. Fabricated in and on the substrate are electrode 133 of monitor pixel 115, response time measurement and correction circuit 150, the pixel drive circuits of the pixels of active portion 102, the auxiliary circuits (not shown) associated with the pixels of the active portion, and the electrodes that define the pixels of the spatial light modulator.

The active portion 102 is divided into pixels each similar to the exemplary pixel 42 described above. However, to simplify the drawing, the pixel electrodes of an exemplary group of the pixels of the active portion are shown at 118. When spatial light modulator 100 is incorporated into a display device, the pixels of the active portion collectively generate an image in response to a set of pixel values constituting a frame of a still or moving picture signal.

Reference portion 104 typically borders at least part of active portion 102. Although most of the reference portion is preferably masked from the viewer, the part of the reference portion adjoining the active portion may be visible. Reference portion 104 is preferably composed of pixels having a structure similar to those of active portion 102. However, the pixels of the reference portion 104 do not display an image and are preferably driven with a pixel drive signal that causes them to display black level.

In one embodiment of the invention, reference portion 104 includes reference pixel group 111 composed of monitor pixel 115, whose pixel electrode is shown at 113, surrounded by guard pixels whose pixel electrodes are shown at 112*a*–112*c*, 114*a*, 114*b*, and 116*a*–116*c*. Monitor pixel driver 350 drives the monitor pixel and the guard pixels with the same pixel drive signal. When driven with the same pixel drive signal as the monitor pixel, the guard pixels prevent capacitative coupling between the monitor pixel and the other pixels of spatial light modulator 100 from causing errors in the measured response time.

Reference portion 104 is described above as being composed of pixels similar to those of active portion 102. However, this is not critical to the invention. For example, monitor pixel 115 may be surrounded by a single, annular guard pixel. Moreover, the monitor pixel need not be the same size and shape as the pixels of the active portion as long as it is surrounded by one or more guard pixels driven by the same or a similar pixel drive signal. When multiple guard pixels are used, they need not have the same size and shape as one another, the pixels of the active portion or the monitor pixel. The size and shape of the pixels of both the active portion and the reference portion are defined by the size and shape of the respective pixel electrodes.

Reference portion 104 is shown in FIG. 5 as including the single monitor pixel 115 and eight guard pixels forming part of a matrix of 3×3 similar-sized pixels. However, this is not critical to the invention. Reference portion 114 may include any number of monitor pixels, and the monitor pixels need not be surrounded by their own guard pixels as long as the location of the monitor pixels is completely surrounded by guard pixels driven by a pixel drive signal that is the same as or similar to the pixel drive signal that drives the monitor pixel or pixels.

It is immaterial whether or not the monitor pixel is located at a position in reference portion 104 that is illuminated. Moreover, any light reflected by the monitor pixel may be masked to prevent the monitor pixel from being seen by the viewer.

Response time measurement and correction circuit 150 fabricated in the semiconductor substrate is composed of optical response detector 200, response time measurement circuit 300, monitor pixel driver 350 and illumination control circuit 400. The auxiliary circuits associated with the pixels of active portion 102 include control signal generator 160, which generates the various clock and control signals required by the pixel drive circuits and is similar to that described in U.S. patent application Ser. No. 09/070,669, assigned to the assignee of this disclosure and incorporated into this disclosure by reference. In the embodiment described herein, the control signal generator is adapted additionally to generate the PRE_APRON, LIGHT_ON and BALANCE signals required by the response time measurement and correction circuit 150.

The monitor pixel driver 350 generates a pixel drive signal that drives the monitor pixel 115 and the guard pixels surrounding the monitor pixel.

Optical response detector 200 detects the optical state of the monitor pixel 115 in response to a signal received via connection 203 and indicating the current flow through the monitor pixel 115. The optical response detector generates a signal that indicates the timing of the change of the optical state of the monitor pixel. The signal representing the timing of the change of the optical state is communicated via connection 108 to response time measurement circuit 300. The optical response time measurement circuit measures the time that elapses between each change in state of the monitor pixel drive signal and the corresponding change in the optical state of the monitor pixel. The resulting response time measurement is then communicated via connections 110 and 111 to illumination control circuit 400. The illumination control circuit receives the LIGHT_ON signal from the control signal generator and delays the LIGHT_ON signal in accordance with the response time measurement to generate the control signal ADJ_LIGHT_ON. The illumination control circuit supplies the ADJ_LIGHT_ON control signal to the light source 15 via connection 18.

The monitor pixel driver 350 receives the signal PRE_APRON from the control signal generator 160 and supplies the pixel drive signal APRON via connection 101 to drive the monitor pixel 115 and its surrounding guard pixels in reference portion 104. Simultaneously with the APRON signal, the pixel drive circuit provides a timing reference signal to the optical response detector 200 via connection 202.

Figure 6:
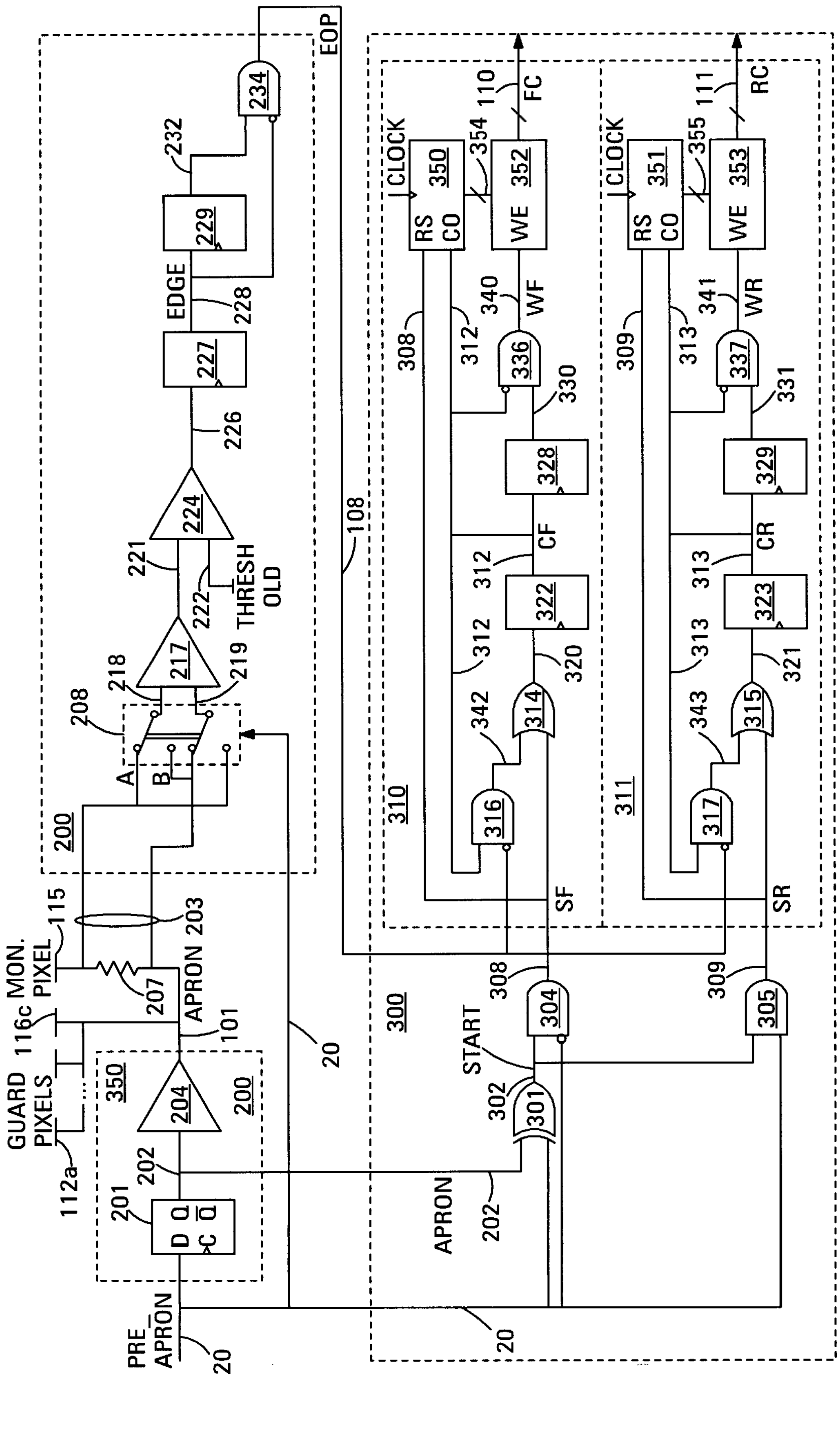
FIG. 6 is a schematic diagram of an example of the monitor pixel driver, optical response detector and response time measurement circuit of the system according to the invention for illuminating an electro-optical material.

FIG. 6 is a schematic view showing an example of the optical response detector 200, the monitor pixel driver 350 and the response time measurement circuit 300 shown in FIG. 5. However, the invention may be implemented using circuits and logic elements different from those shown.

The monitor pixel driver 350 will described first. The monitor pixel driver receives the PRE_APRON signal via connection 20. The PRE_APRON signal is a pixel drive signal having a duty cycle corresponding to black level of the pixels of the active portion 102. The PRE-APRON signal may be generated, for example, by a pixel drive circuit similar to pixel drive circuit 44 (FIG. 1) in response to a pixel value corresponding to black level. The signal PRE-APRON is connected to the D input of flip-flop 201. Flip-flop 201 and all the flip-flops to be described below are D-type flip-flops. Unless otherwise noted, the inputs to all the flip-flops are connected to the D inputs, the outputs from all the flip-flops are taken from the Q outputs and the clock inputs of all the flip-flops are connected to the above-mentioned clock signal. To simplify the drawing, the D input, the clock input C, the Q output and the Q-bar output are labeled only on flip-flop 201.

The output of flip-flop 201 is connected to the input of buffer 204 by connection 202. The output of buffer 204 is connected by connection 101 to pixel electrode 113 of the monitor pixel 115 and to pixel electrodes 112*a*–112*c*, 114*a*, 114*b*, and 161–116*c* of the guard pixels. The pixel electrodes of all the guard pixels of the reference portion are connected directly to connection 101, whereas pixel electrode 113 of the monitor pixel 115 is connected to connection 101 by resistor 207. Connection 203 is connected to the opposite ends of resistor 207 and feeds the voltage generated across this resistor by the current flowing into and of the monitor pixel to the input of the optical response detector 200.

Figures 7A, 7B, 7C, 7D, 7E, 7F, 7G, 7H, 7I, 7J, 7K, 7L:
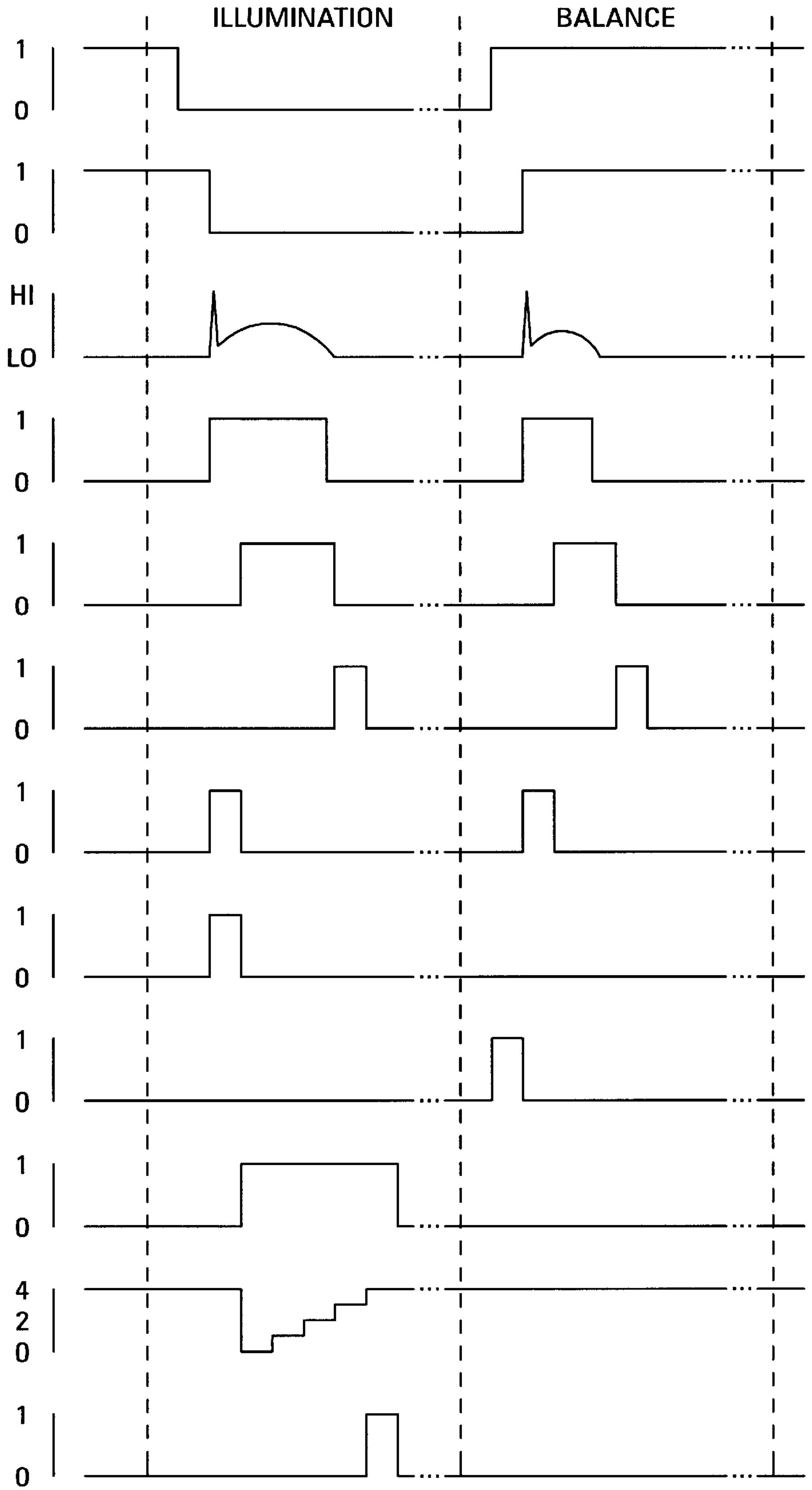
FIGS. 7A–7L are timing diagrams illustrating operation of the monitor pixel driver, optical response detector and response time measurement circuit of the system according to the invention for illuminating an electro-optical material.

Operation of the monitor pixel driver 350 will now be described with reference to FIGS. 6 and 7A and 7B. In FIGS. 7A and 7B, and also in FIGS. 7C–7K, a substantial portion of the time axis is omitted so that events occurring near the changes of state of the PRE-APRON signal can be depicted more clearly. Moreover, the clock signal is shown with a greatly-reduced frequency to enable one clock period-wide pulses to be depicted clearly.

FIG. 7A shows the signal PRE-APRON fed to the input of flip-flop 201. Flip-flop 201 delays the PRE_APRON signal by one cycle of the clock signal to generate the signal APRON shown in FIG. 7B. As will be described in detail below, the response time measurement circuit 300 uses the PRE_APRON signal and the APRON signal to distinguish the rising edges from the falling edges of the pixel drive signal APRON, to be described below, that drives monitor pixel 115 and the guard pixels.

The buffer 204 receives the APRON signal and provides a buffered version of the APRON signal on connection 101 as a pixel drive signal for reference portion 104 of the spatial light modulator. The rising edges of the APRON signal change the optical state of monitor pixel 115 from one corresponding to a dark display pixel to one corresponding to a bright display pixel, whereas the falling edges of the APRON signal change the optical state of the monitor pixel from one corresponding to a bright display pixel to one corresponding to a dark display pixel. As noted above, the optical state of the monitor pixel is the direction of polarization of light that is or would be reflected by the monitor pixel.

As the APRON signal switches the optical state of monitor pixel 115, current flows into or out of the monitor pixel. The current flowing into or out of the monitor pixel generates a voltage difference across resistor 207. Connection 203 feeds this voltage difference to the input of the optical response detector 200.

The optical response detector 200 will now be described. The optical response detector receives the voltage difference representing the current flowing into and out of monitor pixel 115 and generates therefrom a signal that changes state momentarily each time the current flowing into or out of the monitor pixel falls below a threshold level. The voltage difference is fed by connection 203 to the inputs of differential amplifier 217 through the two-pole change-over switch 208. The poles of the change-over switch are connected to the non-inverting and inverting inputs of amplifier 217 by connections 218 and 219. The change-over switch 208 is controlled by the state of the PRE_APRON signal received via connection 20. Using the PRE_APRON signal to control the change-over switch ensures that the state of the change-over switch is set before any change occurs in the state of the signal APRON that drives monitor pixel 115.

The output of the amplifier 217 is connected to one input of comparator 224 by connection 221. The other input of the comparator is connected to the voltage source THRESHOLD by connection 222. The THRESHOLD voltage may be a fixed reference voltage. For example, the THRESHOLD voltage may be bias voltage generated by a bandgap circuit. Details of this circuit have been omitted to simplify the drawing.

The output of comparator 224 is connected by connection 226 to the input of flip-flop 227. The output of flip-flop 227 is connected to the input of flip-flop 229 and to the inverting input of AND gate 234 by connection 228. The output of flip-flop 229 is connected to the other input of AND gate 234 by connection 232. The output of AND gate 234 provides the output of the optical response detector 200 on connection 108.

Operation of the optical response detector 200 will now be described with reference to FIG. 6 and FIGS. 7A–7F. Two-pole change-over switch 208 operates in response to the PRE_APRON signal shown in FIG. 7A to provide the differential amplifier 207 with an input voltage pulse of the same sense regardless of whether current flows into or out of the monitor pixel through resistor 207. Otherwise, when current into monitor pixel 115, amplifier 217 would receive an input voltage pulse in one sense and when current flows out of the monitor pixel, the amplifier would receive an input voltage pulse in the opposite sense. Thus, when current flows out of the monitor pixel, the PRE_APRON signal sets the change-over switch to position A, and when current flows into the monitor pixel, the PRE_APRON signal sets the change-over switch to position B.

The amplifier 217 amplifies the voltage difference between its inputs on connections 218 and 219 to generate a voltage that represents the current flow into or out of monitor pixel 115, as shown in FIG. 7C. The output signal generated by amplifier 217 has a waveform similar to that of current trace 61 illustrated in FIG. 4.

Comparator 224 compares the output signal generated by amplifier 217 with the THRESHOLD voltage. The level of the THRESHOLD voltage fed to comparator 224 should be set low enough so that the comparator will not change state during the time that current flow is in the valley 67 between current pulse 62 and current pulse 64 shown in FIG. 4. With the level of the THRESHOLD voltage set below the level of the valley 67, the output of comparator 224 on connection 226 will change state when the voltage generated at the output of amplifier 217 by the leading edge of current pulse 62 flowing through resistor 207 rises above the THRESHOLD voltage and will revert to its original state when the voltage generated at the output of amplifier 217 by the falling edge of current pulse 64 through resistor 207 falls below the THRESHOLD voltage. FIG. 7D shows the output of the comparator 224. This output is a voltage pulse having voltage levels compatible with the logic input levels of flip-flop 227 and having a pulse width equal to the time during which the current flowing into or out of monitor pixel 115 is greater than the current defined by resistor 207, the THRESHOLD voltage and the gain of the amplifier 217.

The output of the comparator 224 changing state from high to low in response to the falling edge of the current pulse 64 is fed to the input of flip-flop 227 and causes the output of flip-flop 227 to change state on the next occurrence of the clock signal. The output of flip-flop 227 represents output signal of the comparator synchronized to the clock signal. The signal output by flip-flop 227 on connection 228 is called the EDGE signal and is shown in FIG. 7E. The EDGE signal changes to its high state synchronously with the next clock cycle after current starts flowing into or out of monitor pixel 115 and reverts to its low state synchronously with the next clock cycle after current stops flowing into or out of the monitor pixel.

The inverting input of AND gate 234 receives the EDGE signal. Flip-flop 229 delays the EDGE signal generated by flip-flop 227 by one cycle of the clock signal and supplies the delayed EDGE signal to the other input of AND gate 234. The output of AND gate 234 provides the end-of-pulse signal EOP as the output of the optical response detector 200. The end-of-pulse signal goes to its high state synchronously with each falling edge of the EDGE signal on connection 228 and remains in that state for one cycle of the clock signal, as shown in FIG. 7F.

The optical response detector 200 supplies the end-of-pulse signal to the response time measurement circuit 300 via connection 108. The response time measurement circuit will be described next with reference to FIG. 6. In the response time measurement circuit, the end-of-pulse signal EOP is connected to the inverting input of each of AND gates 316 and 317. The response time measurement circuit also receives the APRON signal via connection 202 and the PRE_APRON signal from the control signal generator 160 via connection 20. The APRON signal is applied to one input of exclusive-OR (XOR) gate 301. The PRE_APRON signal is supplied to the other input of XOR gate 301, to the inverting input of AND gate 304 and to one input of AND gate 305. The output of XOR gate 301 is connected by connection 302 to the other input of AND gate 304 and to the other input of AND gate 305.

The output of AND gate 304 provides the START_FALLING signal, abbreviated as SF in FIG. 6, that is connected by connection 308 to the input of the bright-to-dark response time measurement circuit 310. The output of AND gate 307 provides the START_RISING signal, abbreviated as SR in FIG. 6, that is connected by connection 309 to the input of the dark-to-bright response time circuit 311. The signals START_RISING and START_FALLING, to be described in greater detail below, are the signals that start counters that count the number of cycles of the clock signal between the change of state of the APRON signal that drives monitor pixel 115 and the end of the flow of current into or out of the monitor pixel. As noted above, the measurement circuits additionally receive the end-of-pulse signal EOP from the output of the optical response detector 200 via connection 108.

The bright-to-dark response time measurement circuit 310 will now be described. The dark-to-bright response time measurement circuit 311 has the same structure and will not be described. The reference numerals of the elements of the dark-to-bright response time measurement circuit are one greater than the reference numerals of the corresponding elements of the bright-to-dark response time measurement circuit.

The START_FALLING signal output by AND gate 304 is connected by connection 308 to one input of OR gate 314 and to the RESET input RS of counter 352. As noted above, the inverting input of AND gate 316 receives the end-of-pulse signal on connection 108. The other input of AND gate 316 is connected by connection 312 to the output of flip-flop 322. The output of AND gate 316 is connected by connection 342 to the other input of OR gate 314. The output of OR gate 314 is connected by connection 320 to the input of flip-flop 322.

Connection 312 also connects the output of flip-flop 322 to the input of flip-flop 328, to the inverting input of AND gate 336 and to the COUNT input CO of counter 352. The clock input of counter 352 receives the clock signal. The output of counter 352 is connected by connection 354 to the data input of register 356. The output of flip-flop 328 is connected by connection 330 to the other input of AND gate 336. The output of AND gate 336 is connected by connection 340 to the WRITE input WE of the register 356. The data output of register 356 provides the RISING_COUNT output of the response time measurement circuit 300 on connection 110.

Operation of the bright-to-dark response time measurement circuit 310 in response to the START_FALLING signal to generate the FALLING_COUNT will now be described with reference to FIGS. 6 and 7A, 7B and 7G–7L. The PRE_APRON signal described above with reference to FIG. 7A is received via connection 20 and the APRON signal described above with reference to FIG. 7B is received via connection 202. The APRON signal is delayed relative to the PRE_APRON signal by one cycle of the clock signal, as described above. FIG. 7G shows the signal START output by the XOR gate 301. The START signal is normally low, changes to its high state simultaneously with each change in state of the PRE_APRON signal, and reverts to its low state simultaneously with each change in state of the APRON signal. Thus, the START signal is in its high state for one cycle of the clock signal.

The inverting input and the other input of AND gate 304 respectively receive the PRE_APRON signal via connection 20 and the START signal output by XOR gate 301. The output of AND gate 305 generates the START_FALLING signal SF, shown in FIG. 7H. The START_FALLING signal is normally low, changes to its high state simultaneously with each change in state of the signal PRE_APRON from high to low, and reverts to its low state after one cycle of the clock signal.

The inputs of AND gate 305 receive the START signal output by XOR gate 301 and the PRE_APRON signal on connection 20. The output of AND gate 305 generates the START_RISING signal SR, shown in FIG. 7I. The START_RISING signal is normally low, changes to its high state simultaneously with each change in state of the signal PRE_APRON from low to high, and reverts to its low state after one cycle of the clock signal. Thus, the START_RISING and START_FALLING signals are one clock cycle wide pulses that change state simultaneously with the changes in state from low to high and from high to low, respectively, of the PRE_APRON signal.

Operation of the bright-to-dark measurement circuit 310 in response to the START_FALLING signal to generate the FALLING_COUNT value output on connection 110 will now be described with reference to FIGS. 7J–7L. The dark-to-bright measurement circuit 311 operates similarly in response to the START_RISING signal to generate the RISING_COUNT value output on connection 110, so operation of the dark-to-bright measurement circuit will not be separately described.

Prior to the signal PRE_APRON changing state from high to low, the end-of-pulse signal EOP and the COUNT_FALLING signal CF generated by flip-flop 322 are both in their low states, as shown in FIGS. 7F and 7J, respectively. The START_FALLING signal SF generated by AND gate 304 changing to its high state simultaneously with the change of state of the PRE_APRON signal, as shown in FIG. 7H, sets the output of flip-flop 322 to its high state and resets counter 352. Consequently, on the next occurrence of the clock signal, the COUNT_FALLING signal output by flip-flop 322 changes to its high state, as shown in FIG. 7J.

The COUNT_FALLING signal in its high state causes counter 352 to count the cycles of the clock signal, as shown in FIG. 7K. In addition, the COUNT_FALLING signal in its high state sets the input of AND gate 316 to a high state. Since the end-of-pulse signal EOP input to the inverting input of AND gate 316 is in its low state, the output of AND gate 316 goes high. The high output of AND gate 316 holds the output of OR gate 314 in a high state, which, in turn, holds the input of flip-flop 322 high and the COUNT_FALLING signal output by flip-flop 322 high after the START_FALLING signal reverts to its low state.

The COUNT_FALLING signal remains in its high state, as shown in FIG. 7J, until the optical response detector 200 generates the end-of -pulse signal EOP, shown in FIG. 7F, when the current flowing out of monitor pixel 115 falls below the threshold current described above.

The end-of-pulse signal EOP at the inverting input of AND gate 316 sets the output of AND gate to its low state. Since the START_FALLING signal is also in its low state by this time, the output of OR gate 314 goes low. On the next occurrence of the clock signal, the COUNT_FALLING signal CF output by flip-flop 322 goes low, as shown in FIG. 7J.

The low state of the COUNT_FALLING signal stops counter 352 from counting the clock signal, as shown in FIG. 7K. When the counter stops counting, the count value output by the counter on connection 354 represents the number of cycles of the clock signal counted while the COUNT_FALLING signal was in its high state, i.e., during the time from the APRON signal driving monitor pixel 115 changing state and the end-of-pulse signal EOP occurring.

The COUNT_FALLING signal is also fed to the input of flip-flop 328 and the inverting input of AND gate 336. The COUNT_FALLING signal changing to its high state sets the output of flip-flop 328 to its high state on the next occurrence of the clock signal. The high state of the COUNT_FALLING signal also holds the WRITE_FALLING signal WF output by the AND gate in its low state, as shown in FIG. 7L. When the COUNT_FALLING signal changes to its low state, the low state on the inverting input of AND gate 336 allows the WRITE_FALLING signal output by AND gate 336 to go high in response to the output of flip-flop 328, as shown in FIG. 7L. The output of flip-flop 328 remains in its high state for one cycle of the clock signal after the COUNT_FALLING signal changes from high to low. The high state of the WRITE_FALLING signal output by AND gate 336 and fed to the WRITE input WE of the register 356 causes the register to store the count value output by counter 352. The WRITE_FALLING signal output by AND gate 336 reverts to its low state when the output of flip-flop 328 goes low on the next occurrence of the clock signal.

The digital value output by register 356 on connection 110 is the RISING_COUNT value that represents the number of cycles of the clock signal counted by counter 352 while the COUNT_RISING signal was in its high state. The COUNT_RISING signal is in its high state for a time equal to the time that elapses from the APRON signal changing state and the current flowing out of monitor pixel 115 falling below a threshold value.

Operation of the dark-to-bright response time measurement circuit 311 in response to the START_RISING signal to generate the RISING_COUNT identical and will not separately be described.

In an embodiment in which only one of the response times need be measured, one of the response time measurement circuits 310 and 311 and the corresponding one of AND gates 304 and 305 may be omitted.

Figure 8:
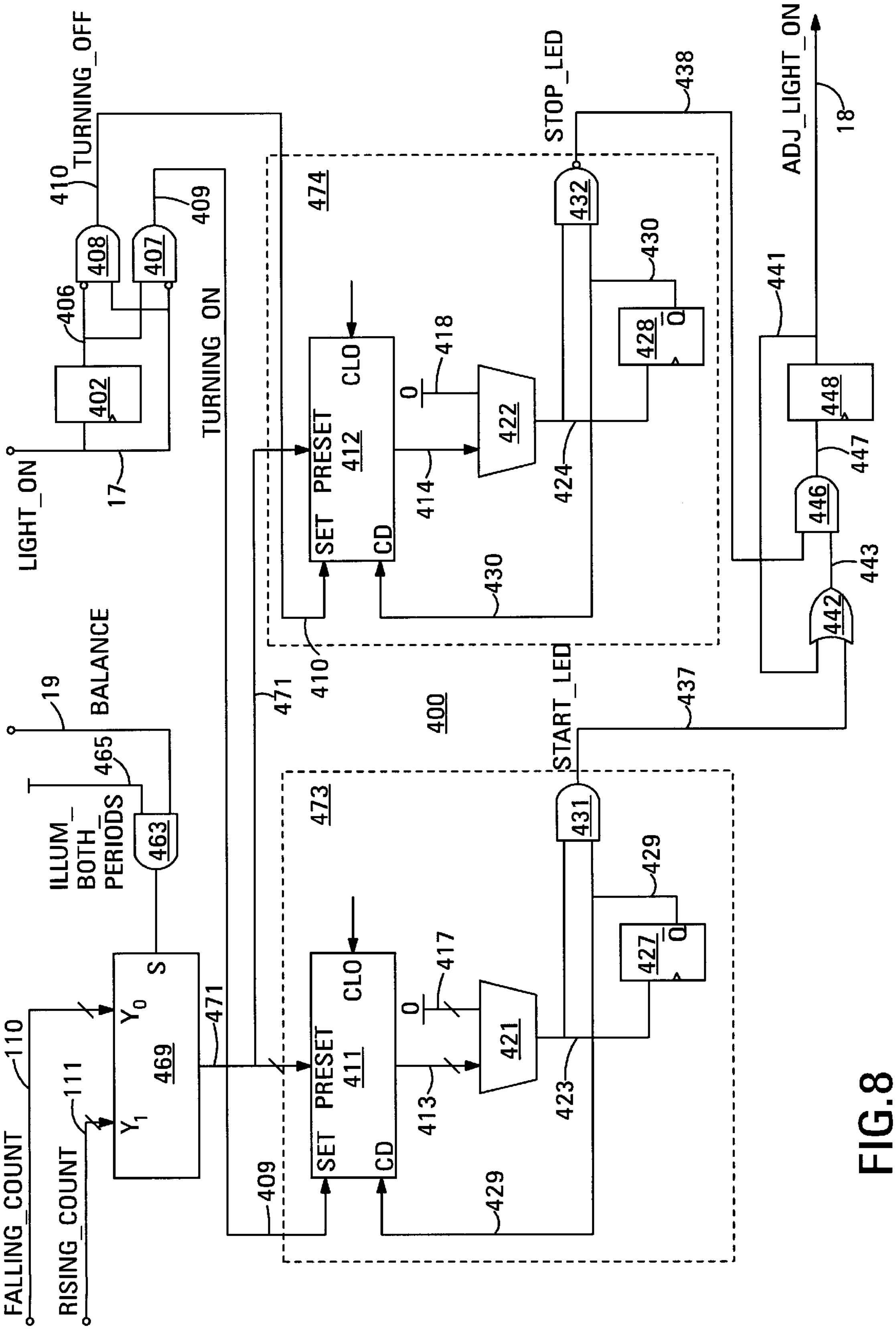
FIG. 8 is a block diagram of an example of the illumination control circuit of the system according to the invention for illuminating an electro-optical material.

FIG. 8 is a block diagram showing an example of illumination control circuit 400 shown in FIG. 5. The state of the ILLUMINATE_BOTH_PERIODS control signal sets the illumination control circuit to operate in one of two different operational modes depending on whether spatial light modulator 100 is illuminated only during the illumination period (mode 1) or during both the illumination period and the balance period (mode 2). The ILLUMINATE_BOTH_PERIODS control signal is fed by connection 461 to one input of AND gate 463. The ILLUMINATE_BOTH_PERIODS control signal may be generated, for example, by setting a jumper depending on the illumination mode of the spatial light modulator. The other input of AND gate 463 is connected by connection 19 to receive the BALANCE control signal from control signal generator 160. The BALANCE control signal is in a high state only during the balance period of the spatial light modulator.

The output of AND gate 463 is connected by connection 467 to the control input S of two-input data selector 469. One data input $Y_0$ of the data selector is connected by connection 110 to response time measurement circuit 300 to receive the FAILING_COUNT value. The other data input $Y_1$ of the data selector is connected by connection 111 to the response time measurement circuit to receive the RISING_COUNT value. The data output of the data selector is connected by connection 471 to the PRESET inputs of down counters 411 and 412.

Illumination control circuit 400 additionally receives the LIGHT_ON signal from the control signal generator 160 via connection 17. The LIGHT_ON signal is connected to the input of flip-flop 402, to the inverting input of AND gate 407 and to one input of AND gate 408. The output of flip-flop 402 is connected by connection 406 to the other input of AND gate 407 and to the inverting input of AND gate 408. The output of AND gate 407 is connected by connection 409 to the SET input of down counter 411 and the output of AND gate 408 is connected by connection 410 to the SET input of down counter 412.

Start circuit 473, composed of down counter 411, digital comparator 421, flip-flop 427 and AND gate 431 interconnected by connections 413, 417, 423 and 429, that generates the START_LED signal will now be described. Stop circuit 474, composed of down counter 412, digital comparator 422, flip-flop 428 and NAND gate 432 interconnected by connections 414, 418, 424 and 430, that generates the STOP_LED signal, differs from start circuit 473 only in that gate 431 is an AND gate whereas gate 432 is a NAND gate. Thus, stop circuit 474 generates the STOP_LED in a sense opposite to that of the START_LED signal generated by start circuit 473. Elements of stop circuit 474 are indicated by reference numerals one greater than corresponding elements of start circuit 473. Stop circuit 474 will not be further described.

In start circuit 473, down counter 411 has a PRESET input connected by connection 471 to the data output of data selector 469, a SET input connected by connection 409 to the output of AND gate 407, a CLOCK input CLO connected to receive the clock signal and a COUNT_DOWN input CD connected by connection 429 to the Q-bar output of flip-flop 427.

The output of down counter 411 is connected to one input of digital comparator 421 by connection 413. The other input of digital comparator 421 is connected to a source of a digital value of zero by connection 417.

The output of digital comparator 421 is connected to the input of flip-flop 427 and to one input of AND gate 431 by connection 423. The Q-bar output of flip-flop 427 is connected by connection 429 additionally to the other input of AND gate 431.

The output of AND gate 432 provides the START_LED signal on connection 437 to one input of OR gate 442. The other input of OR gate 442 is connected to the output of flip-flop 442 by connection 441. The output of OR gate 442 is connected by connection 444 to one input of AND gate 446. The other input of AND-gate 446 is connected by connection 438 to the output of NAND gate 438 to receive the STOP_LED signal generated by stop circuit 474. The output of AND gate 446 is connected by connection 447 to the input of flip-flop 448. The output of flip-flop 448 provides the ADJ_LIGHT_ON signal as the output of illumination control circuit 400 on connection 18.

Operation of illumination control circuit 400 will now be described. The operational mode of the circuit is determined by the state of the ILLUMINATE_BOTH_PERIODS control signal. In the high state of this signal, indicating operational mode 2, the illumination control circuit delays the changes of state of the $LIGHT_{13}$ ON signal by the measured bright-to-dark response time $D_b$ during each illumination period and by the measured dark-to-bright response time $D_w$ during each balance period. In the low state of this signal, indicating operational mode 1, the illumination control circuit delays the changes of state of the LIGHT_ON signal by the measured bright-to-dark response time $D_b$ only during each illumination period.

When operational mode 1 is selected, the low state of the ILLUMINATE_BOTH_PERIODS control signal holds the output of AND gate 463 in its low state. The constant low state on the control input of data selector 469 causes the data selector to feed only the FALLING_COUNT values received via connection 110 to the PRESET inputs of down counters 411 and 412 via connection 471.

In operational mode 2, the high state of the ILLUMINATE_BOTH_PERIODS control signal enables AND gate 463 to feed the BALANCE control signal to the control input S of data selector 469. In each illumination period, the BALANCE control signal in its low state causes the data selector to feed the FALLING_COUNT values to the PRESET inputs of both down counters 411 and 412 via connection 471. In each balance period, the BALANCE control signal in its high state causes the data selector to feed the RISING_COUNT values to the PRESET inputs of both down counters 411 and 412 via connection 471. Thus, in operational mode 2, during each illumination period, a FALLING_COUNT value is present on the PRESET inputs of down counters 411 and 412, whereas during each balance period, a RISING_COUNT value is present the PRESET inputs of down counters 411 and 412.

AND gate 407 generates the TURNING_ON signal in response to each change of state of the LIGHT_ON signal from OFF to ON, and AND gate 408 generates the TURNING_OFF signal in response to each change of state of the LIGHT_ON signal from ON to OFF. The TURNING_ON signal loads the value present at the PRESET input of down counter 411 into down counter 411 and the TURNING_OFF signal loads the value present at the PRESET input of down counter 412 into down counter 412. This loading takes place regardless of the output value of the down counter. In operational mode 1, the TURNING_ON signal causes the FALLING_COUNT value to be loaded into down counter 411 synchronously with the change of state of the LIGHT-ON signal marking the start of the illumination period, and the TURNING_OFF signal causes the FALLING_COUNT value to be loaded into down counter 412 synchronously with the change of state of the LIGHT-ON signal marking the end of the illumination period.

In operational mode 2, the TURNING_ON signal causes the FALLING_COUNT value to loaded into down counter 411 and the TURNING_OFF signal causes the FALLING_COUNT value to be loaded into down counter 412 synchronously with the changes of state of the LIGHT-ON signal marking the start and the end, respectively, of the illumination period. Then, the TURNING_ON signal causes the RISING_COUNT value to loaded into down counter 411 and the TURNING_OFF signal causes the RISING_COUNT value to be loaded into down counter 412 synchronously with the changes of state of the LIGHT-ON signal marking the start and the end, respectively, of the balance period.

Operation of start circuit 473 will now be described. Loading the digital value RISING_COUNT or FALLING_COUNT output by data selector 469 into down counter 411 sets the digital value output by the down counter to the same value. Digital comparator 421 compares the digital value output by down counter 411 with the digital value of zero received via connection 417. Since the digital value output by the down counter after the loading operation is different from zero, the output of the digital comparator changes to its low state. This sets the input of flip-flop 427 and one input of AND gate 431 to their low states. Consequently, on the next cycle of the clock signal, the Q-bar output of the flip-flop changes to its high state. The output of flip-flop 427 is connected to the other input of AND gate 431 but the low input on the one input of AND gate 431 holds the START_LED signal output by AND gate 431 in its low state.

The output of flip-flop 427 is also connected to the COUNT_DOWN input CD of down counter 411. The COUNT_DOWN input changing to its high state causes the down counter to begin counting down the digital value received at its PRESET input. The digital value output by the down counter decrements by one at each cycle of the clock signal. The digital value output by down counter 411 reaches zero at a time corresponding to the number of cycles counted by counter 352 or 353 (FIG. 6) in the response time measurement circuit 300 after the low-to-high transition of the LIGHT_ON signal. This number of cycles corresponds to the measured response time $D_b$ or $D_w$ of monitor pixel 115.

Comparator 421 compares the digital value it receives from the output of down counter 411 via connection 413 with the digital value of zero it receives via connection 417. When the digital value output by the down counter reaches zero, the output of comparator 421, and, hence, the inputs of flip-flop 427 and AND gate 431, change to the high state. Since both inputs of AND gate 431 are now in the high state, the START_LED signal output by AND gate 431 changes to its high state.

On the next cycle of the clock signal, the Q-bar output of flip-flop 427 changes to its low state. The output of flip-flop 427 fed via connection 429 to the input of AND gate 431 causes the START_LED signal output by AND gate 431 to revert to its low state. Thus, the START_LED signal changes to its high state when the output of down counter 411 reaches zero and reverts to its low state one clock cycle later.

The output of flip-flop 427 supplied to the COUNT_DOWN input of down counter 411 changing to its low state inhibits the down counter from counting down below zero and holds the digital value output by the down counter at zero until a new value of FALLING_COUNT or RISING_COUNT is loaded into the down counter. This occurs at the start of the next period in which the spatial light modulator is illuminated.

Operation of the stop circuit 474 in response to the TURNING_OFF signal is similar and will therefore not be described. However, the STOP_LED signal generated by the NAND gate 436 is in the opposite sense to the START_LED signal generated by AND gate 432, i.e., the STOP_LED is normally high and changes to its low state for one clock cycle synchronously with the digital value output by down counter 412 reaching zero. The digital value output by down counter 412 reaches zero at a time corresponding to the number of cycles counted by counter 352 or 353 (FIG. 6) in the response time measurement circuit 300 after the high-to-low transition of the LIGHT_ON signal. This number of cycles corresponds to the measured response time $D_b$ or $D_w$ of monitor pixel 115.

The ADJ_LIGHT_ON signal output by flip-flop 448 is normally in its low state. Consequently, the other input of OR gate 442 is in its low state. Moreover, the START_LED signal is also initially low, so the one input of OR gate 422 is also low, and the one input of AND gate 446 is both low. The output of AND gate 446 on connection 447 is therefore also low, and the output of the flip-flop 448 is maintained in its low state.

When the START_LED signal on connection 437 changes to its high state in response to the digital value output by down counter 411 reaching zero, the output of OR gate 442 and the one input of AND gate 446 change to their high states. The STOP_LED signal at the other input of AND gate 446 is also high (see above), so the output of AND gate 446 changes to its high state. This causes the ADJ_LIGHT_ON signal output by flip-flop 448 to change to its high state on the next occurrence of the clock signal. The ADJ_LIGHT_ON signal in its high state causes light source 15 to illuminate spatial light modulator 100.

The high state of the ADJ_LIGHT_ON signal fed back to the other input of OR gate 442 by connection 441 holds the other input of OR gate 442 high and, hence, holds the one input of AND gate 446 high. The ADJ_LIGHT_ON signal therefore continues in its high state until the STOP_LED signal changes to its low state in response to the digital value output by down counter 412 reaching zero. The low state of the STOP_LED signal sets the output of AND gate 446 and the input of flip-flop 448 to their low states. This causes the ADJ_LIGHT_ON signal output by flip-flop 448 to change to its low state on the next occurrence of the clock signal. The low state of the ADJ_LIGHT_ON signal causes light source 15 to stop illuminating spatial light modulator 100.

The low state of the ADJ_LIGHT_ON signal fed back to the other input of OR gate 442 by connection 441 sets the outputs of OR gate 442 and AND gate 446 to their low states. These states persist when the STOP_LED signal reverts to its high state on the next cycle of the clock signal. The ADJ_LIGHT_ON signal therefore remains in its low state until the START_LED signal once more changes to its high state.

Thus, the states of the ADJ_LIGHT_ON signal follow those of the LIGHT_ON signal but are delayed by a time corresponding to the measured response time of monitor pixel 115. In operating mode 1, the delay time is always that of the bright-to-dark response time $D_b$ of the monitor pixel. In operating mode 2, the delay time in the illumination period is that of the bright-to-dark response time $D_b$ of the monitor pixel and in the balance period is that of the dark-to-bright response time $D_w$ of the monitor pixel.

Figure 9:
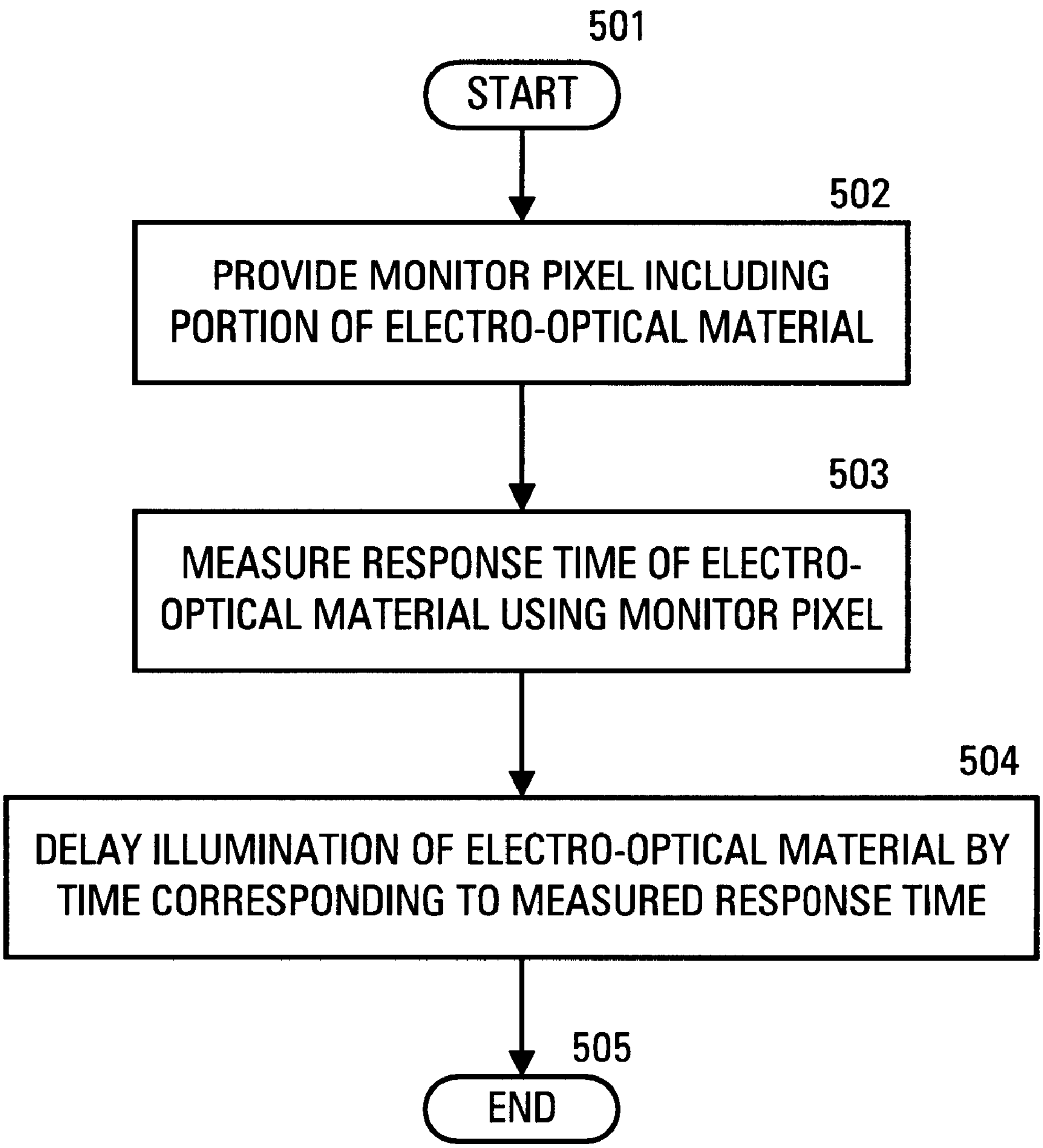
FIG. 9 is a flow chart showing the method according to the invention of operating a display device that includes a layer of electro-optical material.

The method according to the invention for operating a display device that includes a layer of electro-optical material illuminated by pulses of light will now be described with reference to FIG. 9, and with additional reference to FIG. 6.

The method starts in block 501. In block 502, a monitor pixel that includes part of the layer of electro-optical material is provided. For example, the monitor pixel 115 that includes part of the layer 31 of ferro-electric liquid crystal material may be provided.

In block 503, the response time of the electro-optical material is measured using the monitor pixel.

In block 504, illumination of the electro-optical material is delayed by a time corresponding to the measured response time.

The method ends in block 505.

By measuring the response time of the electro-optical material itself, the illumination of the electro-optical material can be delayed so that display pixels defined by other pixels that include the electro-optical material will have a linear grey scale, as described above.

The processing can be performed repetitively so that the delay in the illumination of the electro-optical material can change in accordance with changes in the response time of the electro-optical material caused by changes in the temperature of the electro-optical material.

Figure 10:
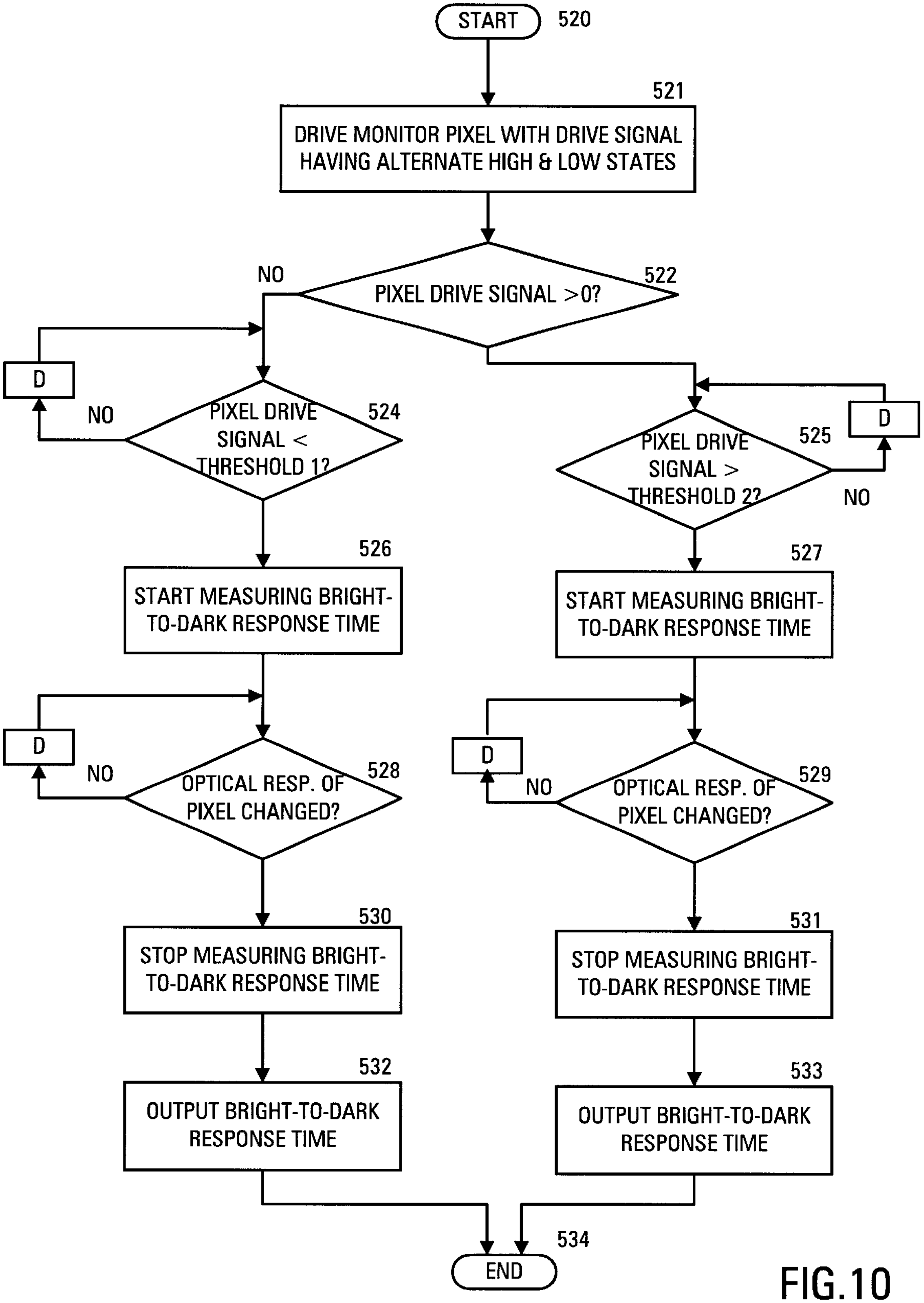
FIG. 10 is a flowchart illustrating an example of the response time measurement processing performed in the method shown in FIG. 9.

An example of the processing that may be performed in block 503 will be described next with reference to FIG. 10, with additional reference to FIG. 6.

Processing starts in block 520. In block 521, the monitor pixel is driven by a monitor pixel drive signal having alternate high and low states. For example, the monitor pixel 115 may be driven with the pixel drive signal APRON shown in FIG. 7A.

In block 522, it is determined whether the level of the pixel drive signal applied to the monitor pixel is equal to zero. For example, the level of the pixel drive signal APRON could be monitored. When it is determined that the value of the pixel drive signal is not equal to zero, execution advances to block 524. Otherwise, execution advances to block 525, which will be described below.

In block 524, a test is performed to determine whether the pixel drive signal applied to the monitor pixel is below a first threshold value. The level of the first threshold value is close to, but greater than, that of the low state of the pixel drive signal. By repetitively performing this test, the occurrence of a change in the state of the pixel drive signal from high to low can be identified. When the test result is NO, indicating that the pixel drive signal is still above the first threshold value, execution reverts to block 524, preferably after a defined delay time D, to allow the test to be repeated. When the test result is YES, indicating that the pixel drive signal has fallen below the first threshold value, execution advances to block 526.

In block 526, measurement the bright-to-dark response time of the monitor pixel is begun. The response time can be measured by counting cycles of the clock signal, for example.

In block 528, a test is performed to determine whether an optical property of monitor pixel has changed in response to the change of state of the pixel drive signal. For example, when the electro-optical material is a liquid crystal material, the optical property that changes is the direction of polarization of the light passing through the electro-optical material, and a determination of whether the optical property of the monitor pixel has changed can be made by monitoring current flowing into or out of the monitor pixel. For example, the test can determine whether the current has fallen below a threshold current. The threshold current may be defined by converting the current flowing into or out of the monitor pixel current to a voltage, amplifying the voltage, and comparing the amplified voltage with the threshold voltage THRESHOLD received on connection 222 shown in FIG. 6, for example.

When the test result is NO, indicating that the optical property of the monitor pixel remains unchanged, execution reverts to block 528, preferably after a defined delay time D, to allow the test to be repeated. When the test result is YES, execution advances to block 530.

In block 530, measurement of the bright-to-dark response time is stopped.

In block 532, the measured bright-to-dark response time is output. Illumination of the electro-optical material can then be delayed by a time corresponding to the measured bright-to-dark response time. For example, a count of the clock signal can be output as the bright-to-dark response time.

Execution then advances to block 534, where it ends.

When it is determined in block 522 that the pixel drive signal applied to the monitor pixel is equal to zero, execution advances to block 525.

In block 525, a test is performed to determine whether the pixel drive signal applied to the monitor pixel is above a second threshold value. The level of the second threshold value is close to, but less than, that of the high state of the pixel drive signal. By repetitively performing this test, the occurrence of a low-to-high transition in the pixel drive signal can be detected. When the test result is NO, indicating that the pixel drive signal is still below the second threshold, execution reverts to block 525, preferably after a defined delay time D, to allow the test to be repeated. When the test result is YES, indicating that the pixel drive signal has risen above the second threshold, execution advances to block 527.

In blocks 527, 529, 531 and 533, the dark-to-bright response time of the monitor pixel is measured and output using processing blocks similar to blocks 527, 528, 530 and 532, respectively, described above. The processing used to measure the dark-to-bright response time will therefore not be described further. Processing then advances to block 534, where it ends.

The above embodiment measures both the bright-to-dark and dark-to-bright response times of the electro-optical material. In an embodiment for use in a display device in which the spatial light modulator is illuminated only during the illumination period, only one of the branches following block 522 need be executed. The other branch from block 522 simply returns to block 522 via a predetermined delay. The branch starting at block 524 is executed when the pixels of the spatial light modulator are ON at the start of the illumination period. The branch starting at block 525 is executed when the pixels of the spatial light modulator are OFF at the start of the illumination period.

Although the invention has been described with reference to embodiments having various exemplary logic states, signal states, optical states, changes of states and directions of polarization, the invention encompasses logic states, signal states, optical states and changes of state opposite to those shown, and directions of polarization orthogonal to those shown.

Although this disclosure describes illustrative embodiments of the invention in detail, it is to be understood that the invention is not limited to the precise embodiments described, and that various modifications may be practiced within the scope of the invention defined by the appended claims.

I claim:

1. A method of illuminating a layer of electro-optical material with pulses of light, the method comprising:

providing a monitor pixel including a portion of the layer of electro-optical material;

measuring a measured response time of the electro-optical material using the monitor pixel; and delaying illumination of the layer of the electro-optical material by a time corresponding to the measured response time of the electro-optical material.

2. The method of claim 1, in which measuring the measured response time of the electro-optical material includes:

applying a monitor pixel drive signal to the monitor pixel; and detecting a change in an optical property of the monitor pixel.

3. The method of claim 2, in which, in detecting the change in the optical property of the monitor pixel, current flowing one of (a) into and (b) out of the monitor pixel is detected.

4. The method of claim 2, in which, in detecting the change in the optical property of the monitor pixel, current flowing one of (a) into and (b) out of the monitor pixel falling below a threshold current is detected.

5. The method of claim 2, in which measuring the measured response time of the electro-optical material additionally includes measuring a time between a change of state of the monitor pixel drive signal and the change in the optical property of the monitor pixel as the measured response time.

6. The method of claim 5, in which, in delaying illumination of the layer of electro-optical material, illumination of the layer of electro-optical material is delayed by a time equal to the measured response time.

7. The method of claim 1, in which:

measuring the measured response time of the electro-optical material includes:

measuring a first measured response time of the electro-optical material, the first measured response time corresponding to a change in an optical property of the monitor pixel from a first state to a second state, and measuring a second measured response time of the electro-optical material, the second measured response time corresponding to a change in the optical property of the monitor pixel from the second state to the first state; and in delaying illumination of the layer of electro-optical material, illumination of the layer of electro-optical material by alternate ones of the pulses of light is delayed by times corresponding to the first measured response time and the second measured response time, respectively, of the electro-optical material.

8. The method of claim 7, in which:

measuring the first measured response time of the electro-optical material includes:

applying to the monitor pixel a monitor pixel drive signal that changes from a first signal state to a second signal state, and detecting the change in the optical property of the monitor pixel from the first state to the second state; and measuring the second measured response time of the electro-optical material includes:

applying to the monitor pixel the monitor pixel drive signal that changes from the second signal state to the first signal state, and detecting the change in the optical property of the monitor pixel from the second state the first state.

9. The method of claim 8, in which, in detecting the change in the optical property of the monitor pixel, current flowing one of (a) into and (b) out of the monitor pixel is detected.

10. The method of claim 8, in which, in detecting the change in the optical property of the monitor pixel, current flowing one of (a) into and (b) out of the monitor pixel falling below a threshold current is detected.

11. A system for illuminating a layer of electro-optical material with pulses of light, the system comprising:

a monitor pixel including a portion of the layer of electro-optical material;

a monitor pixel driver configured to drive the monitor pixel with a monitor pixel drive signal;

an optical response detector coupled to the monitor pixel and configured to generate a detection signal indicating a change in an optical property of the monitor pixel;

a response time measurement circuit configured to measure a measured response time of the electro-optical material in response to the monitor pixel drive signal and the detection signal; and an illumination control circuit configured to delay illumination of the layer of the electro-optical material by a time corresponding to the measured response time of the electro-optical material.

12. The system of claim 11, in which the optical response detector monitors current flowing one of (a) into and (b) out of the monitor pixel to generate the detection signal indicating the change in the optical property of the monitor pixel.

13. The system of claim 12, in which the optical response detector is configured to generate the detection signal when the current flowing one of into and out of the monitor pixel falls below a threshold current.

14. The system of claim 11, in which the response time measurement circuit is configured to measure a time between a change of state of the monitor pixel drive signal and the detection signal as the measured response time.

15. The system of claim 14, in which, the illumination control circuit is configured to delay illumination of the layer of electro-optical material by a time equal to the measured response time.

16. The system of claim 11, in which:

the optical response detector is configured to generate the detection signal indicating a change in the optical property of the monitor pixel from a first state to a second state, and additionally to generate the detection signal indicating a change in the optical property of the monitor from the second state to the first state;

the response time measurement circuit is configured to measure a first measured response time of the electro-optical material corresponding to the change in the optical property of the monitor pixel from the first state to the second state, and additionally to measure a second measured response time of the electro-optical material corresponding to the change in the optical property of the monitor pixel from the second state to the first state; and the illumination control circuit is configured to delay illumination of the layer of electro-optical material by alternate ones of the pulses of light by times corresponding to the first measured response time and the second measured response time, respectively, of the electro-optical material.

17. The system of claim 16, in which the optical response detector monitors current flowing one of (a) into and (b) out of the monitor pixel to generate the detection signal indicating the change in the optical property of the monitor pixel.

18. The system of claim 17, in which the optical response detector is configured to generate the detection signal indicating the change in the optical property of the monitor pixel when the current flowing one of (a) into and (b) out of the monitor pixel falls below a threshold current.

* * * * *